US007772555B2

(12) United States Patent
Hollingsworth

(10) Patent No.: US 7,772,555 B2
(45) Date of Patent: Aug. 10, 2010

(54) PLASMON COUPLING APPARATUS AND METHOD

(75) Inventor: Russell E. Hollingsworth, Arvada, CO (US)

(73) Assignee: ITN Energy Systems, Inc., Littleton, CO (US)

( * ) Notice: Subject to any disclaimer, the term of this patent is extended or adjusted under 35 U.S.C. 154(b) by 375 days.

(21) Appl. No.: 11/671,122

(22) Filed: Feb. 5, 2007

(65) Prior Publication Data

US 2008/0185521 A1 Aug. 7, 2008

(51) Int. Cl.
*G01J 5/00* (2006.01)
*G01N 23/00* (2006.01)
(52) U.S. Cl. ............... 250/338.1; 250/307; 359/298; 359/352; 356/519; 356/480; 343/907
(58) Field of Classification Search .......... 250/338.1, 250/307; 359/298, 352; 356/480, 519; 343/907, 343/909
See application file for complete search history.

(56) References Cited

U.S. PATENT DOCUMENTS

| | | | | |
|---|---|---|---|---|
| 6,649,901 | B2 * | 11/2003 | Thio et al. ................. | 250/216 |
| 6,834,027 | B1 | 12/2004 | Sakaguchi et al. | |
| 7,057,151 | B2 | 6/2006 | Lezec et al. | |
| 7,176,450 | B2 | 2/2007 | Hollingsworth et al. | |
| 7,250,598 | B2 | 7/2007 | Hollingsworth et al. | |
| 2004/0190116 | A1 * | 9/2004 | Lezec et al. ................. | 359/298 |
| 2004/0211901 | A1 * | 10/2004 | Syllaios et al. ......... | 250/339.02 |
| 2006/0209413 | A1 * | 9/2006 | Kim et al. ................. | 359/577 |
| 2008/0174509 | A1 * | 7/2008 | Williams ................. | 343/872 |
| 2009/0261250 | A1 * | 10/2009 | Zhou et al. ................. | 250/307 |

OTHER PUBLICATIONS

Flammer, P.D., et al., "Interference and Resonant Cavity Effects Explain Enhanced Transmission Through Subwavelength Apertures in Thin Metal Films", submitted to physical review letters on Jul. 7, 2006, pp. 1-5.
Schick, I.C., et al., "Experimental study of enhanced transmission through subwavelength linear apertures flanked by periodic corrugations", submitted for inclusion in the SPIE Optics and Photonics Conference of Aug. 15-17, 2006 on Jul. 21, 2006, 10 pages.
Flammer, P.D., et al., "Theoretical study of enhanced transmission through subwavelength linear apertures flanked by periodic corrugations", submitted for inclusion in the SPIE Optics and Photonics Conference of Aug. 15-17, 2006 on Jul. 21, 2006, 10 pages.

(Continued)

*Primary Examiner*—David P Porta
*Assistant Examiner*—Jessica L Eley
(74) *Attorney, Agent, or Firm*—Lathrop & Gage LLP

(57) ABSTRACT

Systems and apparatus enhance transmission of electromagnetic energy through a sub-wavelength aperture. A metal film has an input surface and an output surface and forms the sub-wavelength aperture between the input and output surfaces, a first plurality of grooves on the input surface, and a cavity around the sub-wavelength aperture. The width of the cavity determines a resonant wavelength of electromagnetic energy transmitted through the sub-wavelength aperture. The patterned metal film provides plasmon coupling of electromagnetic energy incident upon the input surface transmit electromagnetic energy through the sub-wavelength aperture.

28 Claims, 16 Drawing Sheets

OTHER PUBLICATIONS

U.S. Appl. No. 11/072,017; Restriction Requirement mailed Dec. 27, 2006; 7 pages.

U.S. Appl. No. 11/072,017; Response to Restriction Requirement mailed Dec. 27, 2006; filed Feb. 27, 2007; 9 pages.

U.S. Appl. No. 11/072,017; Notice of Allowance and Examiner Interview Summary mailed Mar. 22, 2007; 10 pages.

U.S. Appl. No. 11/072,017; Issue Fee Payment; Jun. 22, 2007; 1 page.

Flammer, P.D., et al., Interference and resonant cavity effects explain enhanced transmission through subwavelength apertures in thin metal films, Jun. 25, 2007, vol. 15, No. 13, Optics Express, pp. 7984-7993.

* cited by examiner

PLASMON COUPLING APPARATUS AND METHOD

BACKGROUND

Wavelength scale topography (grooves, holes, bumps, etc.) in metal films provide a means to couple free space photons to surface plasmons (electron oscillations combined with a surface electromagnetic wave). These structures have been shown to enhance transmission through sub-wavelength apertures at resonant wavelengths.

FIG. 1 shows a longitudinal cross-sectional view of a plasmon enhanced near-field optical probe 10(1). Certain features of FIG. 1 are exaggerated for clarity and are not drawn to scale. Plasmon enhanced near-field optical probe 10(1) has an optical fiber 20 that is, for example, a multimode ultraviolet ("UV") grade fiber. Optical fiber 20 includes a full thickness region 26, where cladding 24 surrounds a core 22, and a tapered region 28, where cladding 24 thins and disappears (and where core 22 tapers, as shown). The side of fiber 20 in tapered region 28 is shown as side surface 42. Core 22 ends at fiber end surface 36.

Metal 30 coats side surface 42 and fiber end surface 36, except at an aperture 38. An outside surface of metal 30 in tapered region 28 is side surface 44, as shown. An outside surface of metal 30 counter-faces fiber end surface 36 at a metal end surface 32 as shown. The width of metal end surface 32 (shown by arrow 46) is for example about 5 microns.

Fiber end surface 36 and/or metal end surface 32 may be ruled. As shown in FIG. 1, both surfaces 32, 36 are ruled with rulings 31 having similar periodicity; although the periodicity of either surface may be adjusted to modify the performance of optical probe 10(1).

When electromagnetic (EM) radiation 40 (e.g., "EM radiation") enters core 22, and enters tapered region 28, some of the EM radiation 40 exits core 22 at aperture 38. At fiber end surface 36, a surface plasmon may exist within metal 30, to interact with EM radiation 40 and increase the transmission of EM radiation 40 through aperture 38 and above the transmission obtainable in the absence of ruled surface 36. A surface plasmon may also exist within metal 30 at metal end surface 32, to interact with EM radiation 40 and alter its directionality when exiting aperture 38. The ruled periodicities of fiber end surface 36 and metal end surface 32 may vary to (a) enhance the transmission of EM radiation 40 through aperture 38 and (b) alter the directionality of EM radiation 40 exiting aperture 38.

The combination of a fiber end surface and a metal end surface, with at least one of the surfaces being ruled, is sometimes denoted herein a "plasmon enhancement structure." In FIG. 1, fiber end surface 36 and metal end surface form plasmon enhancement structure 11(1). The combination of a plasmon enhancement structure (e.g., plasmon enhancement structure 11(1)) with an aperture (e.g., aperture 38) forms a "plasmon transmission structure." The use of the terms "plasmon enhancement", "plasmon transmission" and the like may encompass enhanced transmission and/or altered directionality of EM radiation passing through an aperture in a ruled surface, recognizing that underlying physical principles may be described in different terms (e.g., "coherent scattering", "surface waves", "coherent optical phenomenon" and the like).

An extension 34(1) attaches to metal 30 at metal end surface 32 to surround aperture 38 and extend outward (i.e., in the direction of arrow 12) from metal end surface 32.

Rulings 31 on the input surface of plasmon enhancement structure 11(1) have been shown to enhance the transmission through aperture 38 at resonant wavelengths, and rulings on the output surface 32 have been shown to focus or 'beam' the light transmitted through the aperture.

SUMMARY

In one embodiment, a plasmon coupling apparatus enhances transmission of electromagnetic energy through a sub wavelength aperture, and includes a substrate with a patterned metal film that is formed upon the surface of the substrate to form a plurality of grooves and the aperture. The aperture is separated from a nearest one of the grooves by a distance that determines resonance wavelength of the plasmon coupling apparatus.

In another embodiment, an apparatus enhances transmission of electromagnetic energy through a sub-wavelength aperture. A metal film has an input surface and an output surface and forms (a) the sub-wavelength aperture between the input and output surfaces, (b) a first plurality of grooves on the input surface, and (c) a cavity around the sub-wavelength aperture. The width of the cavity determines a resonant wavelength of electromagnetic energy transmitted through the sub-wavelength aperture. The patterned metal film provides plasmon coupling of electromagnetic energy incident upon the input surface to transmit electromagnetic energy through the sub-wavelength aperture.

In another embodiment, a non-polarized bandpass optical filter includes a plurality of non-polarized optical input areas, each forming a plurality of dimples or bumps, and a plurality of non-polarized optical output areas, each forming at least one aperture that is separated from the nearest of the plurality of dimples or bumps by a distance that determines a resonance wavelength of the non-polarized bandpass optical filter.

In another embodiment, a polarized bandpass optical filter includes a first optical input area that forms a plurality of first parallel linear grooves, and a second optical input area that forms a plurality of second parallel linear grooves. The first and second optical input areas form a first linear sub-wavelength optical aperture parallel to the linear grooves. A nearest linear groove of each of the first and second optical input areas to the first linear sub-wavelength aperture form a cavity with a width that determines resonance wavelength of the optical filter.

In another embodiment, an apparatus spatially separates horizontal and vertical polarized light. Each of a plurality of non-polarized optical input areas has a plurality of dimples or bumps. At least one vertically polarized optical output area forms at least one horizontal linear sub-wavelength aperture. The nearest of the plurality of dimples or bumps on both sides of the horizontal linear sub-wavelength aperture form a first cavity with a width that determines the resonance wavelength of the vertically polarized optical output area. At least one horizontally polarized optical output area forms at least one vertical linear sub-wavelength aperture. The nearest of the plurality of dimples or bumps on both sides of the vertical linear sub-wavelength aperture forms a second cavity with a width that determines a resonance wavelength of the horizontally polarized optical output area.

In another embodiment, a plasmon enhanced near-field optical probe, includes an optical coupler with an end face, a metal coating and an extension for probe-to-sample separation feedback. The metal coating covers, except for an aperture, the end face. The end face and metal coating form a plurality of concentric grooves around the aperture such that electromagnetic energy transmitted through the aperture has transmission properties dependent upon spacing between the aperture and the nearest groove. The extension extends from the aperture and away from the optical coupler.

In another embodiment, an enhanced microbolometer pixel includes a non-polarized bandpass optical filter and a microbolometer pixel. The non-polarized bandpass optical filter operates to filter incident light such that only non-polarized light of a desired frequency range is incident upon the microbolometer pixel.

In another embodiment, an enhanced microbolometer pixel includes a polarized bandpass optical filter and a microbolometer pixel. The polarized bandpass optical filter operates to filter incident light such that only polarized light of a desired frequency range and polarization is incident upon the microbolometer pixel.

DETAILED DESCRIPTION OF THE FIGURES

Prior work has assumed that the ruling (i.e., groove) period determines resonant wavelength. However, it is shown in the detailed description of the drawings below that the spacing between the aperture and the first groove on an input surface determines the resonant wavelength of light transmitted through the aperture and that the spacing between the aperture and the first groove on an output surface determines the resonant wavelength of light beamed away from the aperture. Background information relating to transmission of light through sub-wavelength apertures can be found in a paper by P. D. Flammer, I. C. Schick, J. M. Yarbrough, C. G. Allen, G. Nuebel, E. J. Schick, J. M. Dahdah, J. T. Martineau, M. A. Hurowitz, R. E. Hollingsworth, and R. T. Collins, titled "Theoretical study of enhanced transmission through sub-wavelength linear apertures flanked by periodic corrugations", presented at the Plasmonics: Metallic Nanostructures and their Optical Properties IV, San Diego, Calif., USA, 2006, SPIE Proceedings 63231Z-63210 (2006), and in a paper by I. C. Schick, P. D. Flammer, J. M. Yarbrough, C. G. Allen, G. J. Nuebel, E. J. Schick, J. M. Dahdah, J. T. Martineau, M. A. Hurowitz, R. E. Hollingsworth, and R. T. Collins, titled "Experimental study of enhanced transmission through sub-wavelength linear apertures flanked by periodic corrugations", presented at the Plasmonics: Metallic Nanostructures and their Optical Properties IV, San Diego, Calif., USA, 2006, SPIE proceedings 63230L-63210, (2006).

2D Resonator

Figure 1:
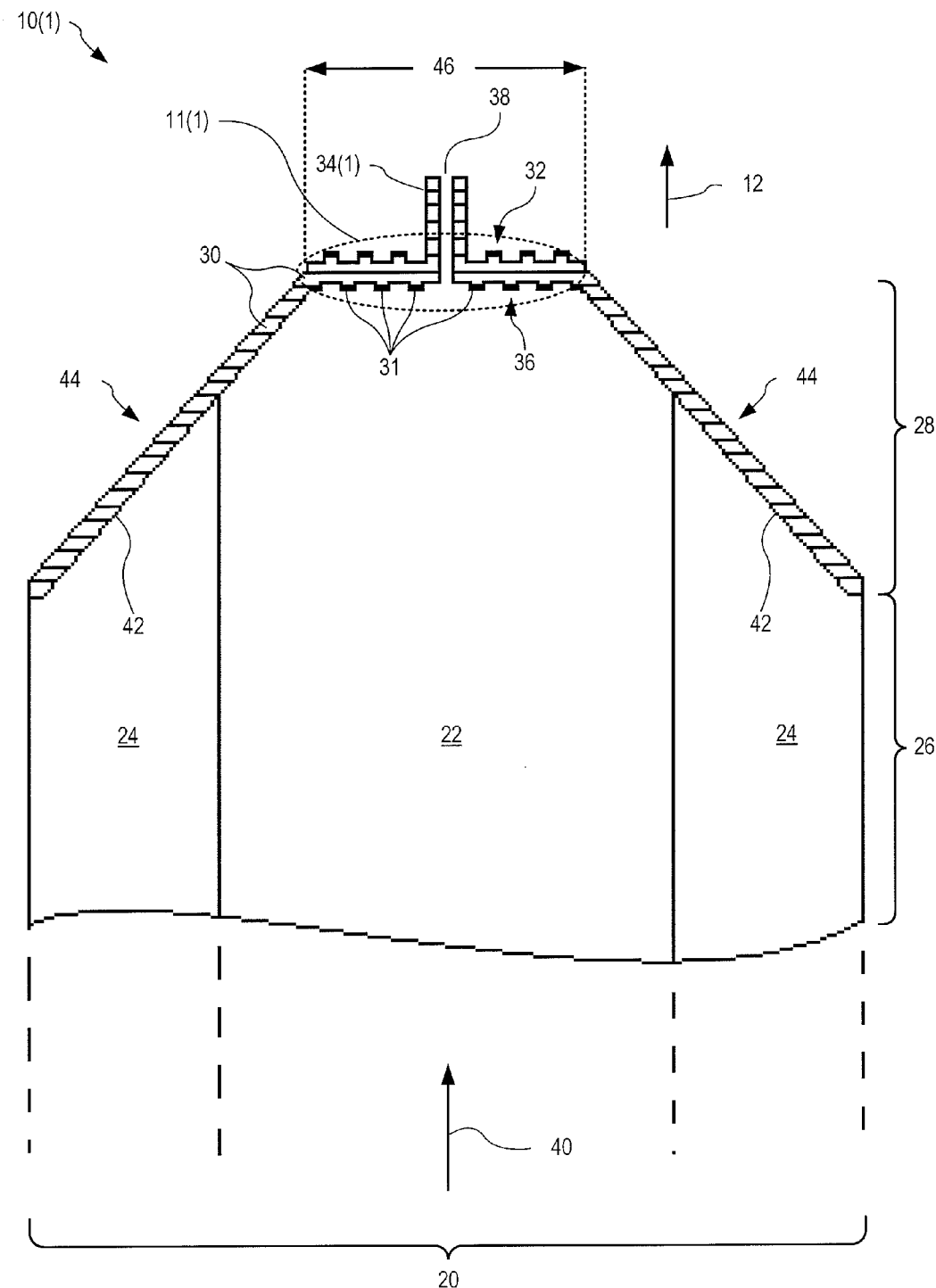
FIG. 1 shows a longitudinal cross-sectional view of a prior art plasmon enhanced near-field optical probe.
Figure 2A:
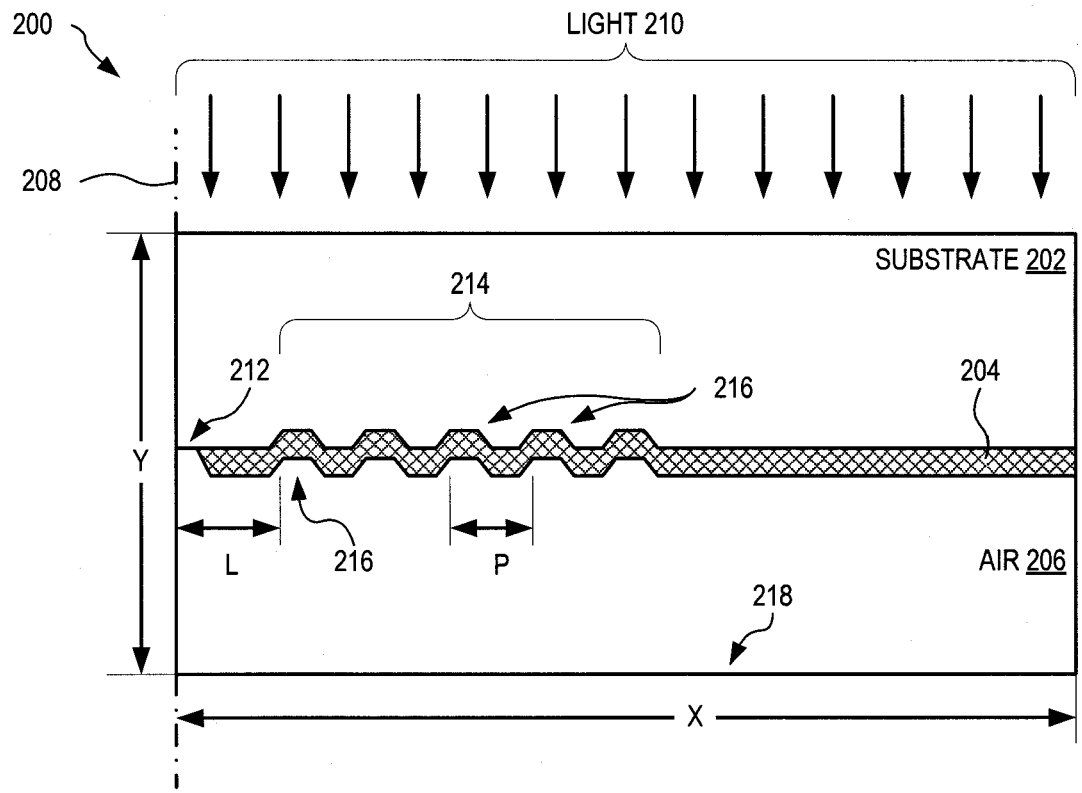
FIG. 2A shows one exemplary two dimensional plasmon coupling device model with a linear grating and an aperture.

FIG. 2A shows one exemplary two dimensional plasmon coupling device model 200 formed with a linear grating 214 and an aperture 212. Model 200 has mirror symmetry about axis 208 which passes through the middle of aperture 212. Model 200 also has a glass substrate 202, a patterned metal film 204 and air 206. In one example, model 200 has a horizontal dimension X of 5 µm and a vertical dimension Y of 2 µm. A first groove 216 is a distance L from the center of aperture 212. The distance between first groove 216 and its symmetrical counterpart may sometimes be referred to as the cavity width '$w_c$', hereinafter. A plane wave of light 210 is incident upon substrate 202 from the top of model 200, and the wavelength of light 210 is varied.

Transmission of light through aperture 212 is determined (e.g., by calculation) at a line 218 integral with the bottom of model 200. Cavity length 'L', period 'P', shape of the grooves, number of grooves and shape of the aperture are varied during modeling. Further, several sets of linear gratings have been fabricated with cavity length 'L' as the primary variable.

Fabrication

Figure 2B:
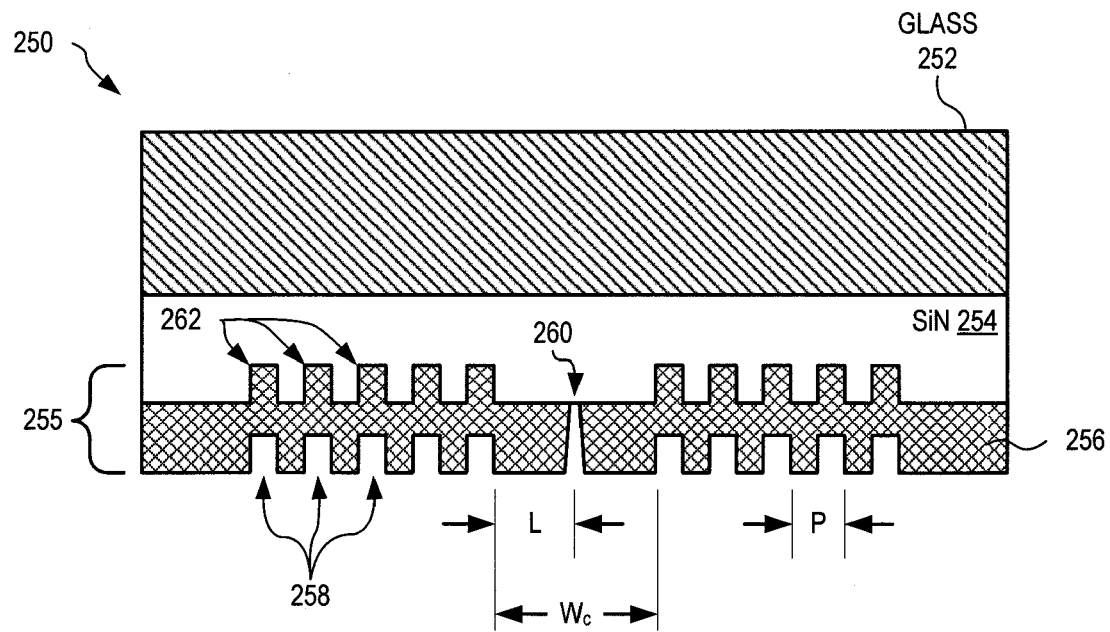
FIG. 2B shows a cross-section through one exemplary plasmon coupling device with a linear grating and an aperture.

FIG. 2B shows a cross-section through one exemplary plasmon coupling device 250 with a linear grating 255 and an aperture 260. Fabrication of plasmon coupling device 250 starts by depositing a SiN layer 254 onto a glass chip 252. In one example, SiN layer 254 is 2000 Å thick and is deposited by plasma enhanced chemical vapor deposition onto glass chip 252 which is 1 cm$^2$. An Au layer (not shown) is deposited into the surface of SiN layer 254 to provide a conductive surface. In one example, this Au layer is deposited by e-beam evaporation to a thickness of 100 Å. A 50 μm long linear groove pattern is then defined in Polymethylglutarimide (PMGI) resist using e-beam lithography. Grooves 262 are then cut into SiN layer 254 and remaining PMGI is then removed. In one embodiment, grooves 262 are 750 Å deep and are cut by broad beam argon ion milling. A Ti layer (not shown) of 25 Å thickness is deposited onto SiN layer 254 to provide adhesion for deposition of an Au layer 256. In one embodiment, Au layer 256 is deposited by e-beam evaporation to a thickness of 2000 Å. Au layer 256 may be between 300-5000 Å in thickness, and is preferably between 1500-2500 Å in thickness. An aperture is then defined, for example, using PMGI resist and e-beam lithography; and an aperture 260 is cut though Au layer 256. In one embodiment, broad beam argon ion milling is used to cut aperture 260 completely through Au layer 256. As shown in FIG. 2B, deposition of Au layer 256 results in formation of grooves 258 with a period 'P'. In the embodiment of FIG. 2B, linear grating 255 has five grooves 258 on each side of aperture 260.

For experimentation, a first chip was fabricated with several plasmon coupling devices (e.g., plasmon coupling device 250) with varying groove periods 'P' of 400, 450, and 500 nm, where cavity length L was varied from 0 to 600 nm in steps of 100 nm for the 400 and 500 nm groove periods, and in steps of 50 nm for the 450 nm groove period. A second chip was fabricated with several plasmon coupling devices each having ten grooves (e.g., grooves 258) on each side of the aperture (e.g., aperture 260), and groove periods 'P' of 400 and 450 nm. Cavity length varied from 400 to 1050 nm in 50 nm steps for both periods.

Figure 3:
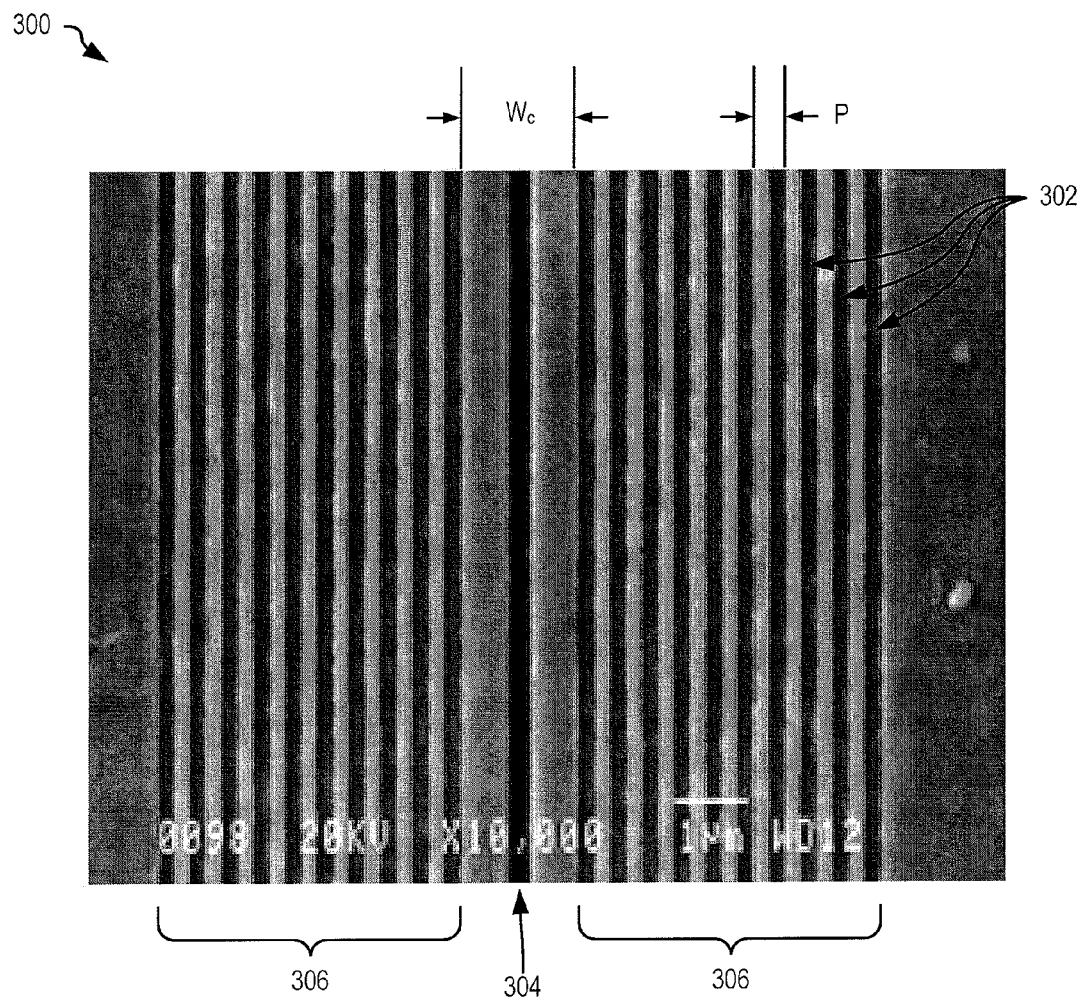
FIG. 3 shows a SEM image of one exemplary plasmon coupling device with a linear grating, an aperture and a cavity.

One exemplary plasmon coupling device 300 with a linear grating 306 and an aperture 304 is shown in FIG. 3. Of note, aperture 304 has tapered side walls, similar to those illustrated in FIGS. 2A and 2B, while grooves 302 have nearly vertical side walls.

Figure 4:
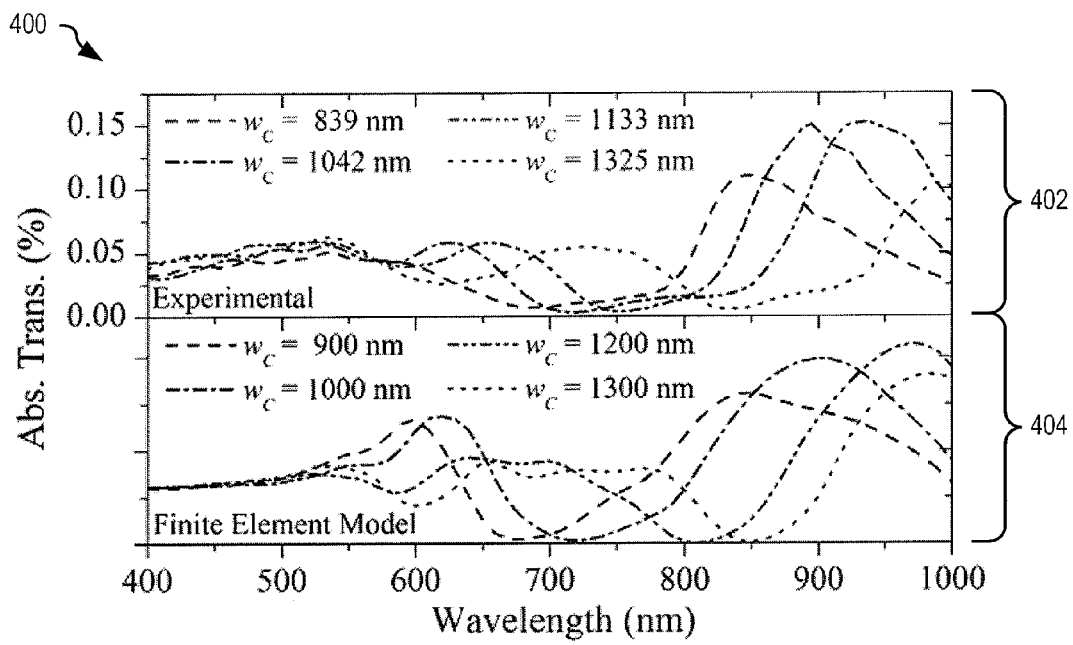
FIG. 4 shows a first graph of measured transmission spectra for four exemplary plasmon coupling devices with different cavity length values and a second graph of simulated results for four exemplary models.

FIG. 4 shows a graph 402 of measured transmission spectra for four exemplary plasmon coupling devices of cavity width values of 839 nm, 1042 nm, 1133 nm and 1325 nm for light polarized with an electric field perpendicular (i.e., p-polarized) to the grooves (e.g., grooves 302, FIG. 3) and a second graph 404 of simulated results for four exemplary models with cavity widths of 900 nm, 1000 nm, 1200 nm and 1300 nm. In particular, FIG. 4 shows a range of plasmon coupling peak positions and amplitudes. Graph 402 shows absolute output measurements and graph 404 shows relative transmission. The general trend of increasing plasmon coupling peak position with increasing cavity length is reproduced, as is the presence of multiple plasmon coupling peaks. Some offset in the position of the largest peak is observed between modeling and measurement; this may be due to simplifications in the modeled geometry.

Figure 5:
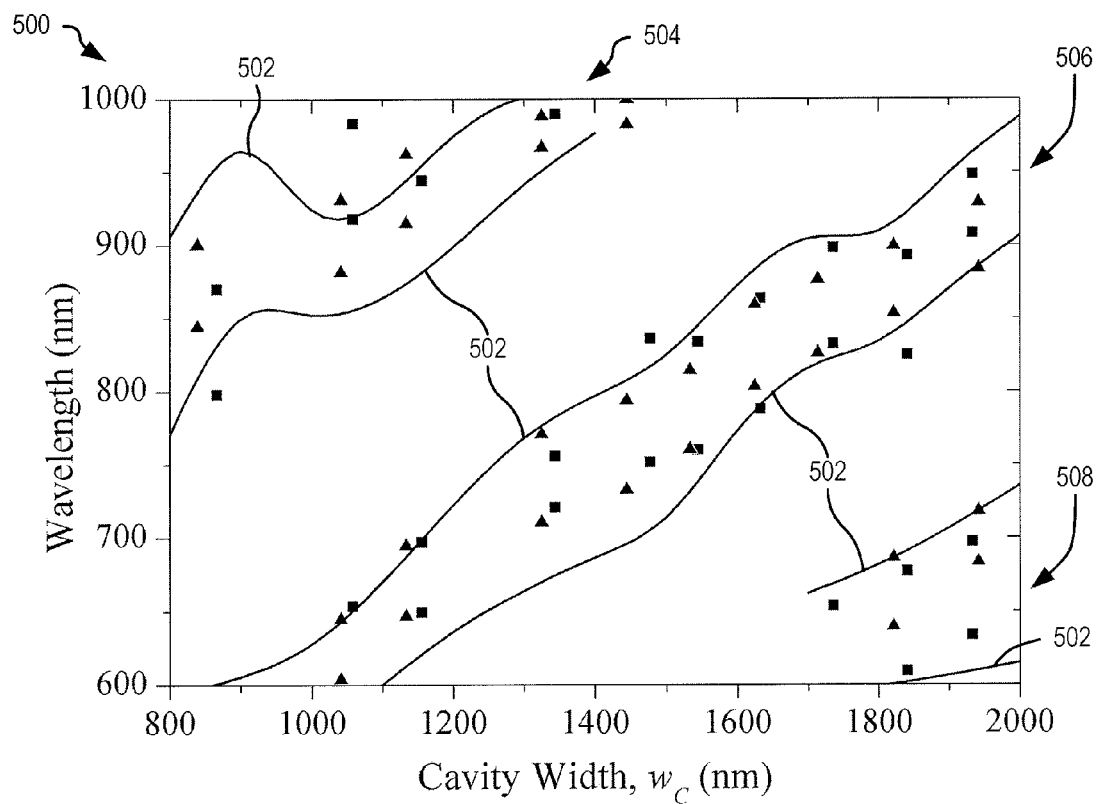
FIG. 5 is a graph showing peak plasmon coupling as a function of cavity length for groove periods 'P' of 400 nm and 450 nm.

FIG. 5 is a graph 500 showing measured peak plasmon coupling as a function of cavity length for groove periods 'P' of 400 nm (plotted as triangular symbols) and 450 nm (plotted as square symbols). In graph 500, a correlation is shown between cavity width '$W_c$', plotted on the X axis, and peak plasmon coupling positions of spectra, plotted on the Y axis. Lines 502 are generated from finite element modeling and indicate predicted coupling. Three bands 504, 506 and 508 having wavelength varying with cavity length are common to the two groove periods, with little dependence of peak plasmon coupling position on groove period. If groove period were dominant, the peak position would be constant with cavity length and the peak for the two periods would be offset by ~90 nm (difference in period times substrate index of refraction). Preliminary modeling (e.g., using model 200 of FIG. 2A) of the fabricated structure shows good agreement between modeled and measured transmission spectra, as indicated by lines 502.

Figure 6:
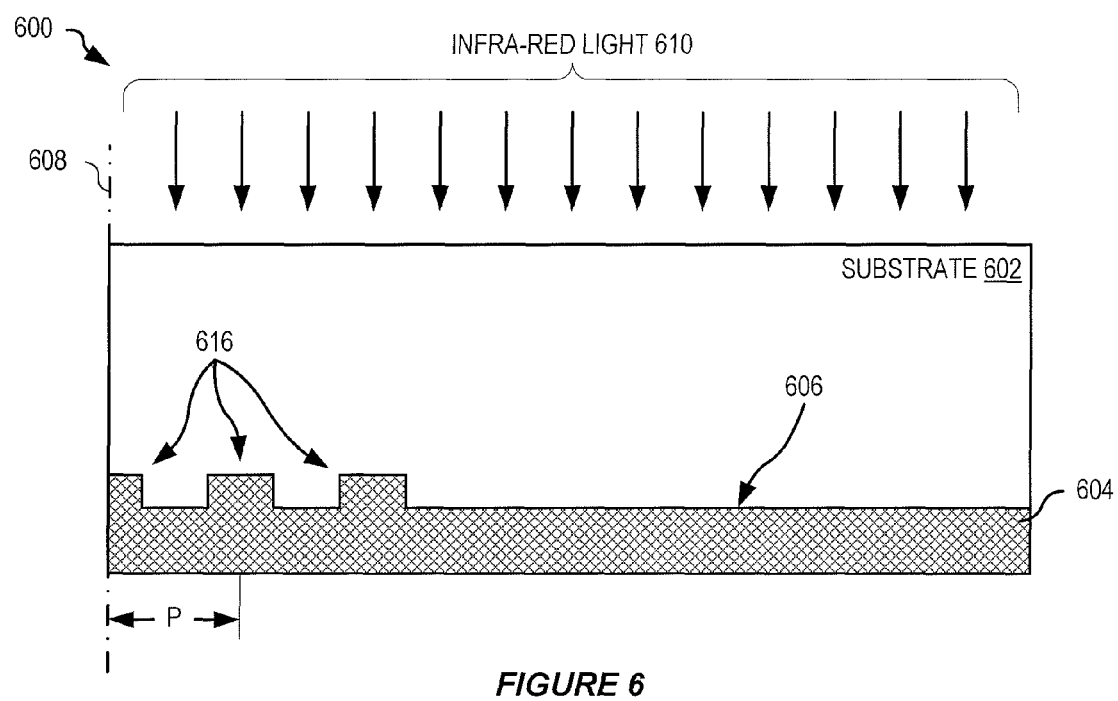
FIG. 6 shows one exemplary plasmon coupling device model with a grating consisting of five grooves formed upon a SiN substrate and an Au layer.

Modeling of a structure with grooves but no aperture provides insight into the observed results. FIG. 6 shows one exemplary plasmon coupling device model 600 with three grooves 616 within a silicon substrate 602 and an Au layer 604. Of note, model 600 has no aperture. Model 600 has infrared light 610 incident through silicon substrate 602 onto square grooves 616. Silicon substrate 602 is idealized to have a constant index of refraction n=3.5 with no absorption. Grooves 616 are modeled at periods of 360 nm and 600 nm with seven and three (shown) grooves respectively. Grooves 616 are centered on a mirror symmetry axis 608 of model 600 for the examination of plasmon surface waves launched down gold film 604.

In the contours graphs of FIGS. 7, 8, 9B, 10B-10E and 11A, the contour lines connect points of equal time average power density. Low density areas are labeled 'Low' and high density areas are labeled 'High'.

Figure 7:
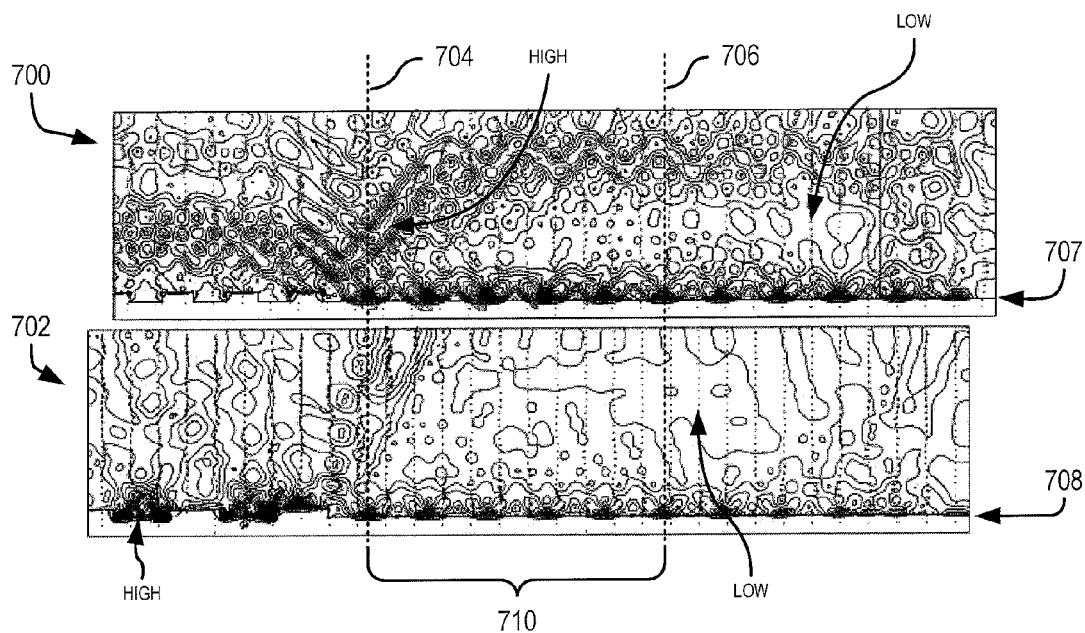
FIG. 7 shows a graph of time average power density for the model of FIG. 6 with an input light wavelength of 1260 nm and a groove period of 360 nm; and a graph of time average power density for the model of FIG. 6 with an input wavelength of 1260 nm and a groove period of 600 nm.

FIG. 7 shows a contour graph 700 of time average power density at an input wavelength of 1260 nm; and a groove period P of 360 nm and a contour graph 702 of time average power density at an input wavelength of 1260 nm for a groove period P of 600 nm. Notice that the power (plasmon) exhibits an undulating path along surface 606 of model 600 with alternating areas of high and low intensity forming a surface wave 707, 708. Graphs 700 and 702 are offset to align first surface maxima. The undulation of the surface wave arises from interference between incident plane wave and the surface plasmon wave launched by the grating structure. Two vertical dashed lines 704 and 706 are added to define a period 710 showing that the wavelength of surface waves 707 and 708 is nearly independent of groove period P. The amplitude of surface wave 708 (for the groove period of 600 nm) is smaller than that of surface wave 707 (for the groove period of 360 nm). The upper transmission peak in each band of FIG. 5 arises from interference between the incident plane wave and surface plasmon wave.

Figure 8:
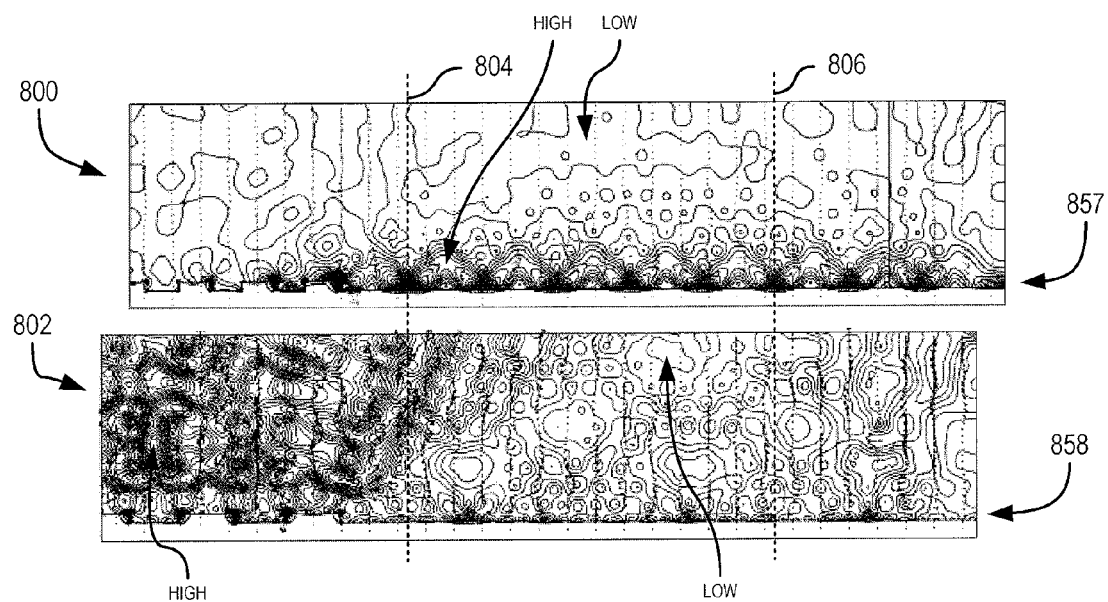
FIG. 8 shows a graph of time average power density for the model of FIG. 6 with an input wavelength of 1540 nm and a groove period of 360 nm; and a graph of time average power density for the model of FIG. 6 with an input wavelength of 1540 nm and a groove period of 600 nm.

FIG. 8 shows a contour graph 800 of time average power density at an input wavelength of 1540 nm and a groove period P of 360 nm; and a contour graph 802 of time average power density at an input wavelength of 1540 nm for a groove period P of 600 nm. In particular, FIG. 8 shows the impact of grating period P on amplitude of a surface wave for an input wavelength of 1540 nm. In contour graph 800, a surface wave 857 is shown when modeling a grating with a grating period P of 360 nm but virtually no surface wave 858 with a grating period of 600 nm. Comparison of FIGS. 7 and 8 also shows that the wavelength of the surface wave increases as wavelength of incident light increases, and that the location of the first surface maximum changes relative to the edge of the last groove. Other modeling with an aperture to the right of the grooves shows transmission through the aperture only occurs when both the surface wave has high intensity on the metal surface and power is flowing toward the surface.

Similar behavior occurs for structures fabricated with grooves on either side of an aperture as shown in model 200 of FIG. 2A. Surface waves are launched toward aperture 212 from grooves 216 on both sides of metal film 204 and these surface waves therefore interfere with one another. Maximum transmission occurs when the time average power flow at the surface of metal film 204 around aperture 212 is a) a maximum and is directed toward the surface and b) when these two surface waves constructively interfere with one another. Condition a) is useful for transmission of light through aperture 212. Constructive interference may also occur when power flow is away from the metal surface of aperture 212; however, no transmission of light through aperture 212 results.

Figure 17:
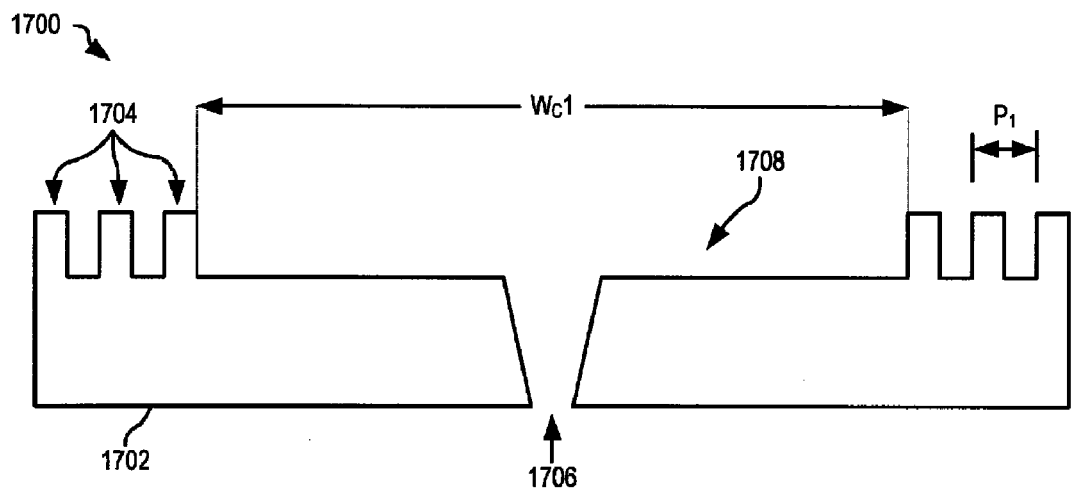
FIG. 17 shows one exemplary cross section through a metal film with grooves formed above the level of a cavity surrounding an aperture.

FIG. 17 shows one exemplary plasmon device 1700 formed as a metal foil 1702 with grooves 1704 raised above the level of a cavity 1708 that surrounds an aperture 1706. Cavity 1708 is shown with a width $W_{c1}$ between grooves 1704 either side of aperture 1706. Grooves 1704 are shown with a period of $P_1$.

Figure 18:
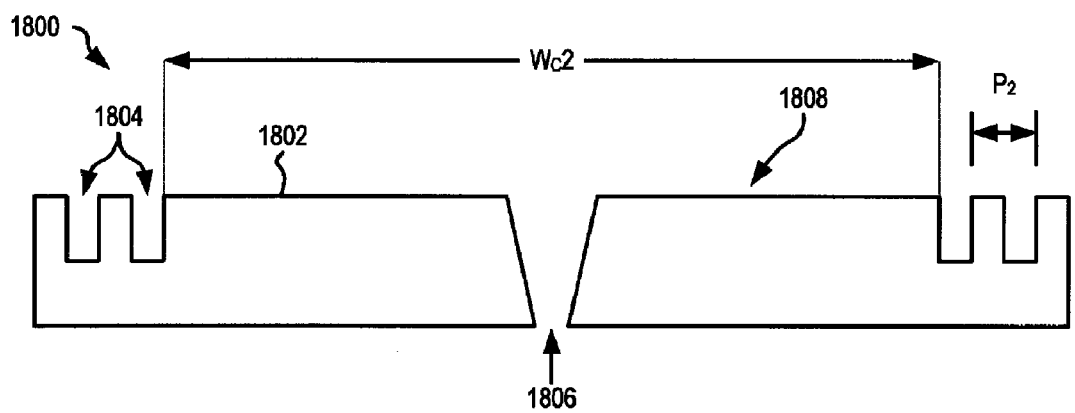
FIG. 18 shows one exemplary cross section through a metal film with grooves formed below the level of a cavity surrounding an aperture.

FIG. 18 shows one exemplary plasmon device 1800 formed as a metal foil 1802 with grooves 1804 formed below the level of a cavity 1808 that surrounds an aperture 1806. Cavity 1808 is shown having a width $W_{c2}$ between grooves 1804 either side of aperture 1806. Grooves 1806 are shown having a period of $P_2$.

Figure 19:
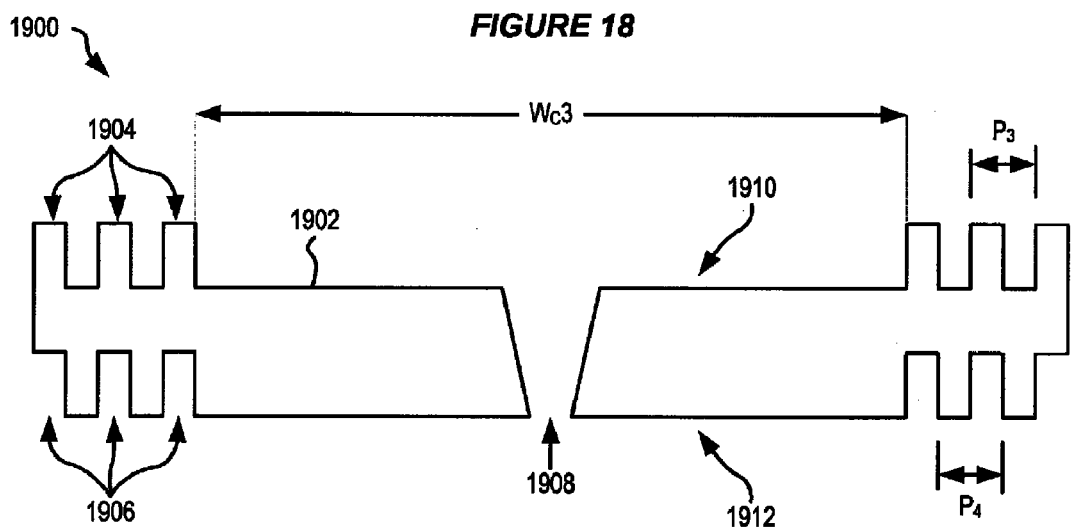
FIG. 19 shows one exemplary cross section through a metal film with grooves on the input side and output side of an aperture.

FIG. 19 shows one exemplary plasmon device 1900 formed as a metal foil 1902 with grooves 1904 formed above the level of a cavity 1910 that surrounds an aperture 1908. Cavity 1910 is shown having a width $W_{c3}$ between grooves 1904 either side of aperture 1908. Grooves 1904 are shown having a period of $P_3$. A second cavity 1912 is formed upon a second side of metal foil 1902 between second grooves 1906 that surround aperture 1908. Cavity 1912 also has a width $W_{c3}$, in this example. However, cavity 1912 may be formed of a different width by varying positioning of grooves 1906. Grooves 1906 are shown having a period $P_4$. Periods $P_3$ and $P_4$ may be the same or different as a matter of design choice. FIGS. 17, 18 and 19 are best viewed together with the following description.

The plasmon coupling device of model 200, FIG. 2A, may be considered as a two dimensional Fabry Perot resonator with grooves 216 acting as mirrors and the smooth metal film 204 between grooves 216 acting as a resonant cavity. The lower transmission peak in each band of FIG. 5 arises from a surface cavity resonance. Optimization of a Fabry Perot resonator generally involves maximizing the reflectivity of these mirrors and minimizing the loss in the cavity.

For the two dimensional case, mirror reflectivity may be adjusted through changes in period P of grooves 216, as described above. The number of grooves and the geometric shape of each groove also impacts reflectivity of the grooves. As shown in devices 1700, 1800 and 1900, grooves 1704, 1804, 1904 and 1906, respectively, have substantially vertical side walls, which may provide high surface wave reflection from the first groove, but with rapidly decreasing effects from the grooves farther from the cavity edge. Modeling of grooves with a 45° slope, as shown in FIG. 2A, appears to show an increase in the contribution from the grooves farther from the cavity edge; thus, more of the surface wave can pass over a sloped wall and hence interact with more of the grooves. Groove depth may also be an important variable. Inverting the grooves, as shown in device 1800, allows the surface wave to see a trench instead of a wall which may be another way to modify the reflectivity. This may thus provide the most sensitivity to grating period and hence the sharpest resonance width, but may need many more grooves to achieve high reflectivity. Grooves may have walls angled between 30 and 60 degrees without departing from the scope hereof.

Minimizing cavity loss has several aspects. First, surface roughness should be minimal. The metal should have low loss at the operating wavelength. Silver has the lowest loss of any metal and can thus operate at visible or longer wavelengths. Gold has the next lowest loss, but only for wavelengths greater than about 600 nm. For infrared or longer wavelengths, aluminum and copper are also good choices. As a practical matter, fabrication on most substrates will utilize an adhesion layer between the substrate and metal, especially with silver and gold. Titanium is widely used as an adhesion layer, but other metals such as chromium and nickel may be used. This adhesion layer may have a strong impact on the cavity loss. Modeling one particular cavity length shows that 2.5 nm of titanium used as an adhesion layer under gold reduces the transmitted peak intensity by 40%.

Output Beaming

As mentioned above, in a plasmon coupled device, grooves on the output surface are known to focus (or beam) the output light at a resonance wavelength, previously thought to be a function of the groove period. However, as shown above, plasmon coupling and output beaming occurs at a wavelength resonance based upon the cavity length L. A dielectric layer deposited on top of the metal layer to match the substrate index of refraction may also have a strong impact on the plasmon coupled output field distribution; the thickness of this dielectric matching layer is critical. Further, the shape of the aperture is also critical for controlling the plasmon coupled output field distribution.

Figure 9A:
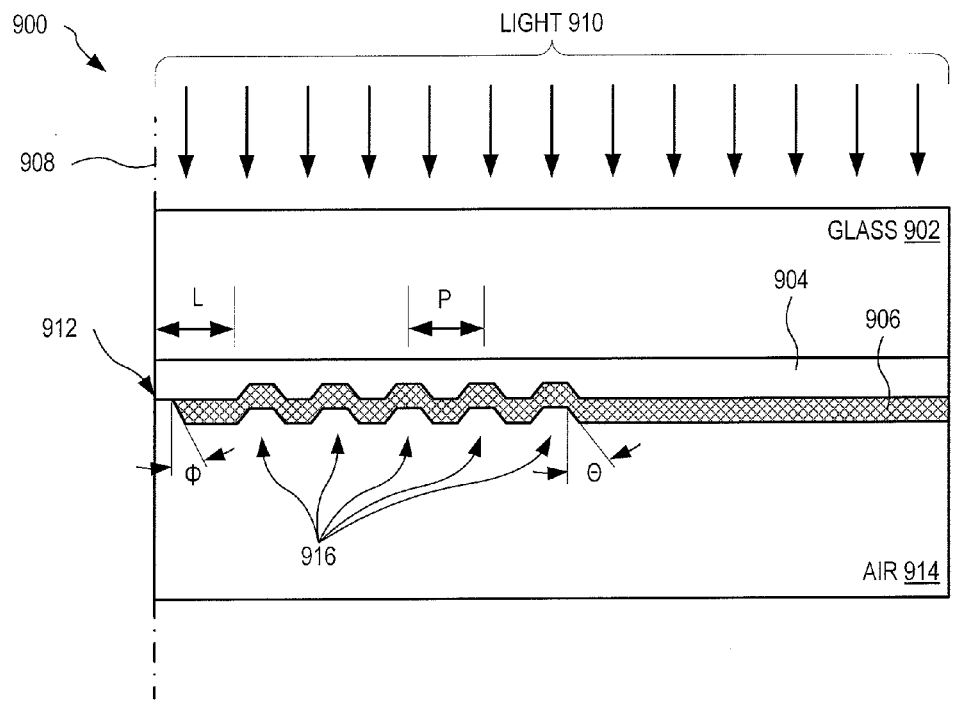
FIG. 9A shows a plasmon coupling device model with a grating and an aperture formed from a glass substrate, a SiN layer, a patterned gold layer and air.

FIG. 9A shows a plasmon coupling device model 900 with a glass substrate 902, a SiN layer 904, a patterned gold layer 906, an aperture 912 and air 914. Model 900 is symmetric about line 908 such that line 908 passes through the center of aperture 912, which is formed to have an opening angle φ. Patterned gold layer 906 has five grooves 916, each with a wall angle θ, and a groove period P; grooves 916 also form a cavity length L. Light 910 is incident upon glass substrate 902, as shown.

Figure 9B:
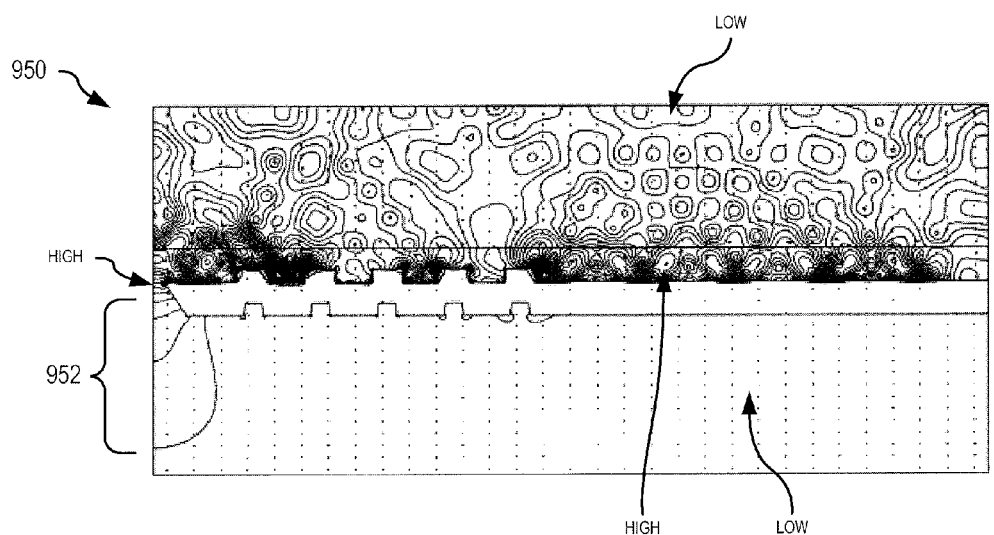
FIG. 9B gives exemplary output from simulation of the model of FIG. 9A illustrating plasmon coupling with beaming at the cavity resonance wavelength.

FIG. 9B shows exemplary output resulting from simulation of model 900 of FIG. 9A, illustrating plasmon coupling with beaming at the cavity resonance wavelength. In this example, groove period P is 400 nm, cavity length L is 500 nm and aperture 912 has a width of 100 nm adjacent to SiN layer 904 (input side) and a width of 400 nm adjacent to air 914 (output side). The illustrated wavelength corresponds to the maximum transmission and shows clear beaming 952 of light output through aperture 912. In the conventional view, where it was previously believed that grating period dominates, the maximum transmission (in this example) would be expected to occur at a wavelength of approximately 680 nm (grating period times substrate index of refraction) and beaming would occur at approximately 400 nm (grating period times index of refraction of air). However, as seen in FIG. 9B, this is not the case, thereby showing that the conventional view of grating period dominating the resonant frequency does not hold.

Figure 10A:
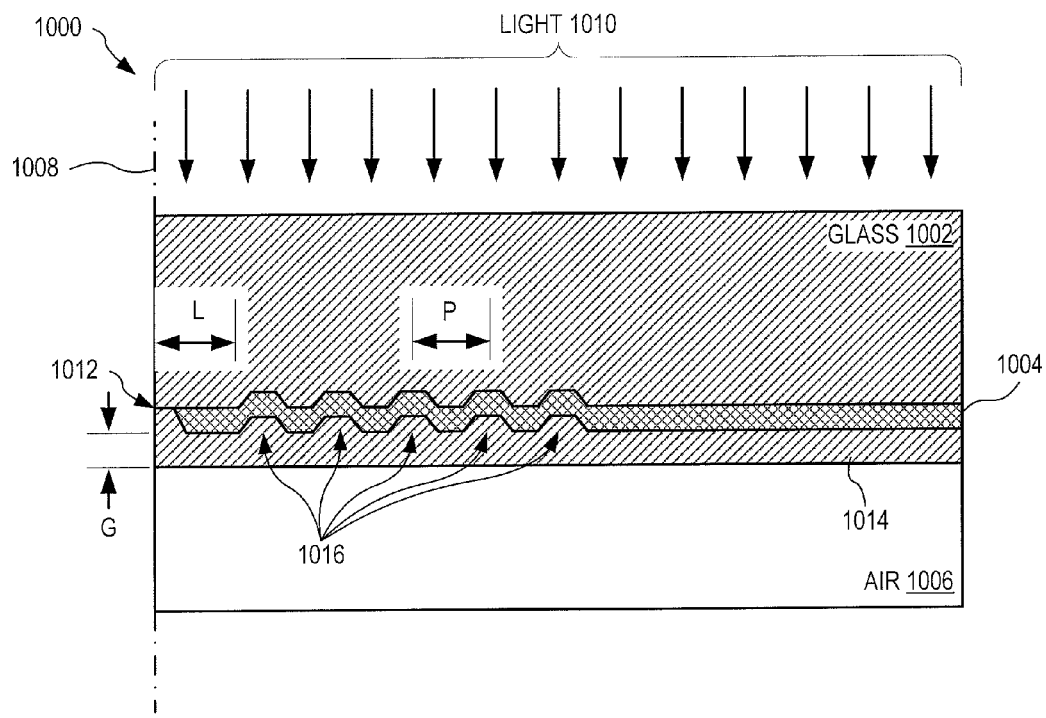
FIG. 10A shows a plasmon coupling device model with a grating and aperture formed from a glass substrate, a patterned gold film, an aperture, a dielectric layer and air.

FIG. 10A shows a plasmon coupling model 1000 that has a glass substrate 1002, a patterned gold film 1004, an aperture 1012, a dielectric layer 1014 and air 1006. Patterned gold film 1004 has five grooves 1016 with a period P that form a cavity length L, and a dielectric layer 1014, of thickness G, adjacent to patterned metal film 1004 with a smooth surface adjacent to air 1006. Dielectric layer 1014 is, for example, glass with a matching refractive index to glass layer 1002.

Figure 10B:
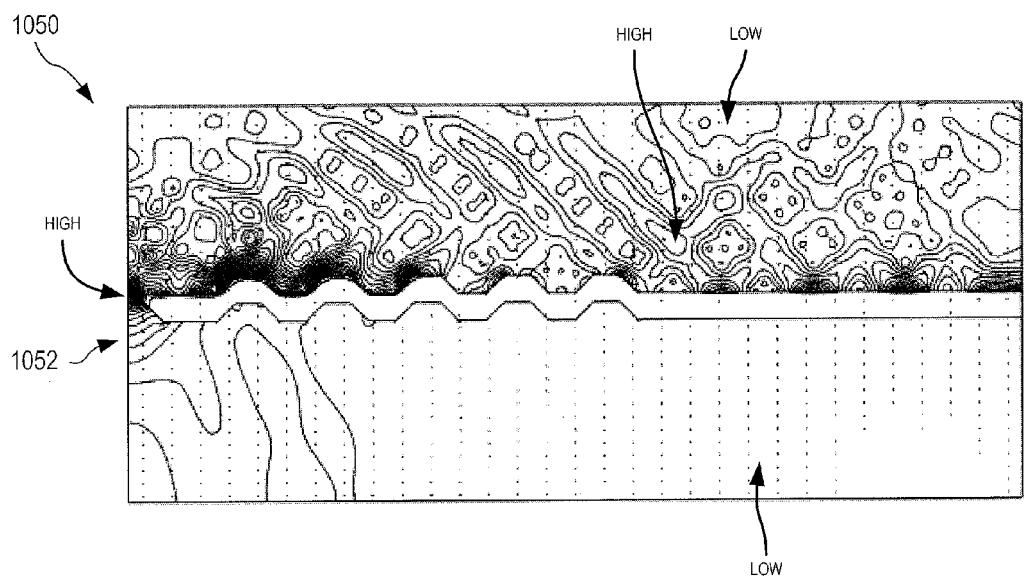
FIGS. 10B, 10C, 10D and 10E show exemplary results from simulating the model of FIG. 10A for different thicknesses of the dielectric layer to illustrate plasmon coupling and output beaming at a wavelength of 800 nm.
Figure 10C:
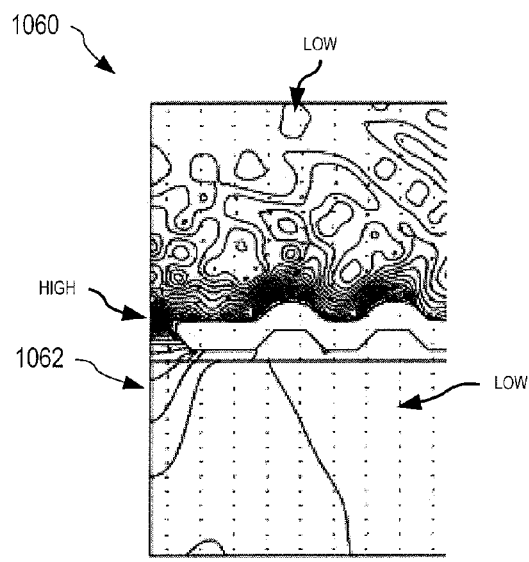
Figure 10D:
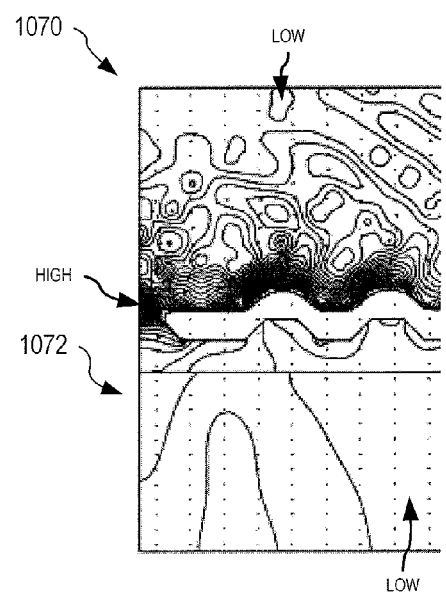
Figure 10E:
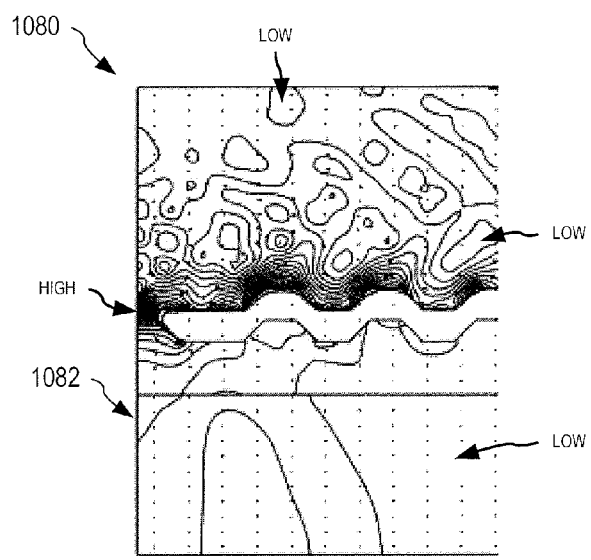

FIGS. 10B, 10C, 10D and 10E show exemplary results from simulation of model 1000 for different thicknesses of dielectric layer 1014 to illustrate plasmon coupling and output beaming at a wavelength of 800 nm. In these examples, model 1000 has a period P of 500 nm, a cavity length L of 500 nm, a width 100 nm of aperture 1012 on the input side (adjacent to glass substrate 1002) and a width 400 nm of aperture 1012 on the output side. In FIGS. 10C, 10D and 10E, the black line below patterned metal film 1004 marks the edge of dielectric layer 1014.

FIG. 10B shows an exemplary contour graph 1050 of time average power density resulting from simulation of model 1000 without additional dielectric layer 1014. FIG. 10C shows an exemplary contour graph 1060 of time average power density resulting from simulation of model 1000 with a dielectric layer 1014 thickness of 50 nm illustrating time average power density of output beam 1062. FIG. 10D shows an exemplary contour graph 1070 of time average power density resulting from simulation of model 1000 with a dielectric layer 1014 thickness of 150 nm illustrating time average power density of output beam 1072. FIG. 10E shows an exemplary contour graph 1080 of time average power density resulting from simulation of model 1000 with a dielectric layer 1014 thickness of 250 nm illustrating time average power density of output beam 1082. As seen from these results, for the exemplary geometry of model 1000, a dielectric layer 1014 thickness of 50 nm maximizes plasmon coupling and power in a central beam.

Figure 11A:
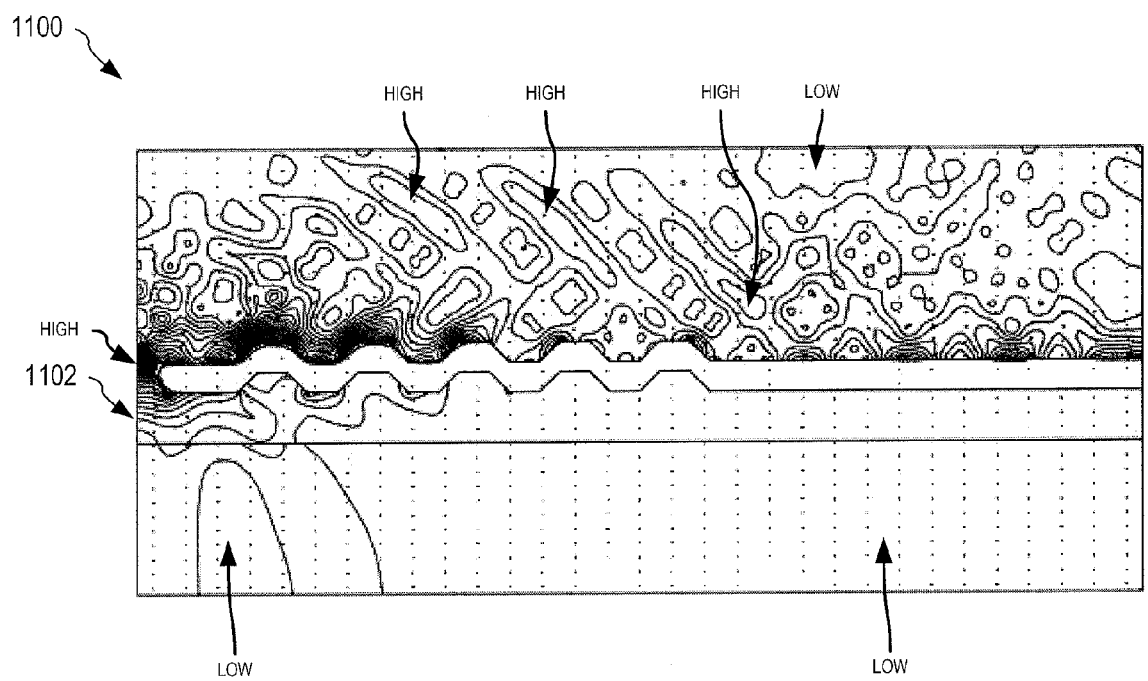
FIGS. 11A, 11B, 11C and 11D show exemplary results from simulations of the model of FIG. 10A with variations in output width of the aperture and illustrating plasmon coupling and field distribution at a wavelength of 800 nm as a function of aperture shape.
Figure 11B:
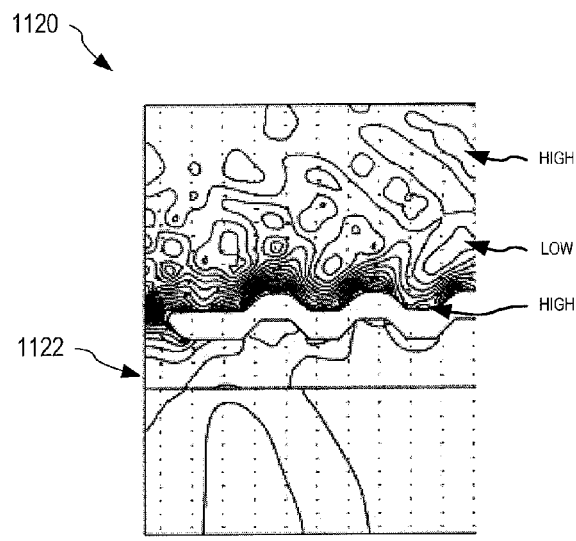
Figure 11C:
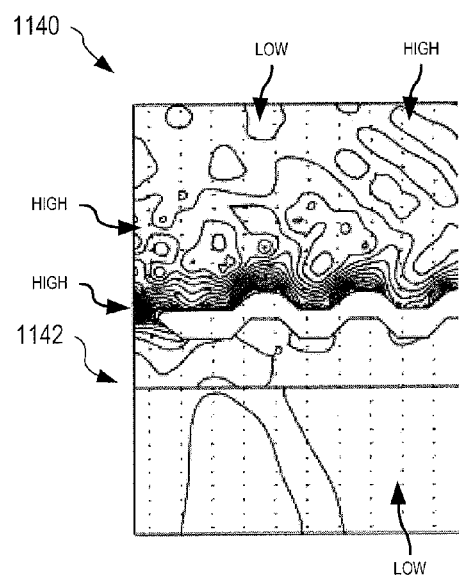
Figure 11D:
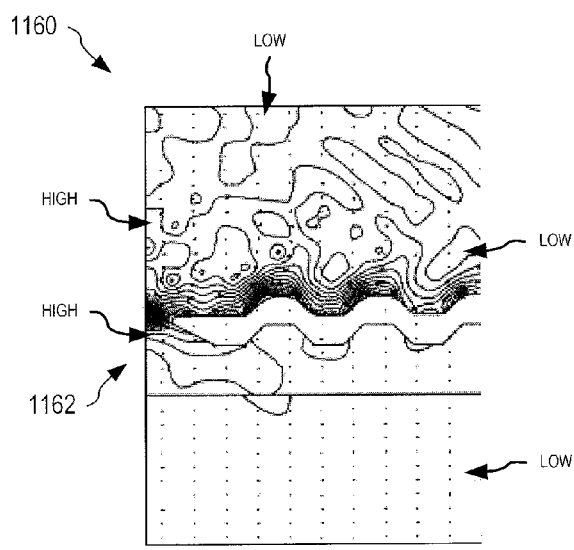

FIGS. 11A, 11B, 11C and 11D show exemplary results from simulations of model 1000 with variations in output width of aperture 1012 and illustrating plasmon coupling and field distribution at a wavelength of 800 nm as a function of aperture shape. In these simulations, grooves 1016 have a period P of 500 nm and provide a cavity length L of 500 nm. Dielectric layer 1014 is glass with a thickness of 250 nm. The input (substrate 1002 side) of aperture 1012 has a fixed width of 100 nm for each simulation whereas the output width varies from 300 to 700 nm. FIG. 11A shows an exemplary contour graph 1100 of time average power density resulting from simulation of model 1000 with an output aperture size of 300 nm illustrating time average power density of output beam 1102. FIG. 11B shows an exemplary contour graph 1120 of time average power density resulting from simulation of model 1000 with an output aperture size of 400 nm illustrating time average power density of output beam 1122. FIG. 11C shows an exemplary contour graph 1140 of time average power density resulting from simulation of model 1000 with an output aperture size of 500 nm illustrating time average power density of output beam 1142. FIG. 11D shows an exemplary contour graph 1160 of time average power density resulting from simulation of model 1000 with an output aperture size of 700 nm illustrating time average power density of output beam 1162.

As can be seen in FIGS. 11A, 11B, 11C and 11D, plasmon coupling and output field distribution changes from having most of the power in a central lobe at 400 nm and 500 nm aperture output widths to having a weak secondary lobe with most power trapped near the surface at an aperture output width of 700 nm. Other modeling also shows that the aperture shape has a similar affect when there is no output side glass (e.g., dielectric layer 1014, FIG. 10A).

Polarizing Devices

Figure 12:
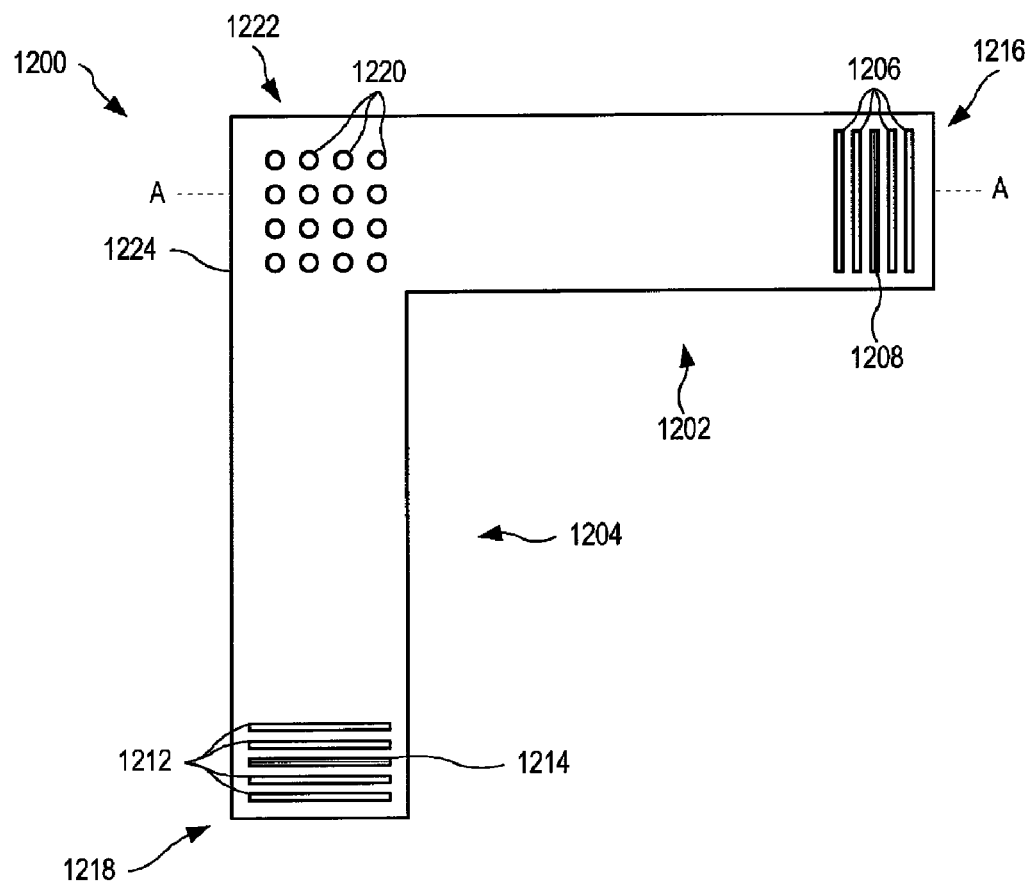
FIG. 12 shows a plasmon coupling polarization device for separating non-polarized light into horizontally polarized light and vertically polarized light.

FIG. 12 shows a plasmon coupling polarization device 1200 for separating non-polarized light into horizontally polarized light and vertically polarized light. Device 1200 has a horizontal plasmon waveguide 1202 and a vertical plasmon waveguide 1204. Plasmon waveguides 1202 and 1204 meet to form an input coupler 1222 that has a plurality of bumps or dimples 1220. Horizontal plasmon waveguide 1202 has vertical grooves 1206 either side of a vertical aperture 1208 at an apposing end to input coupler 1222. Vertical plasmon waveguide 1204 has horizontal grooves 1212 at either side of a horizontal aperture 1214 and at an apposing end to input coupler 1222. Input coupler 1222 and plasmon waveguides 1202 and 1204 may be made of a metal film such as gold.

Model 700 of FIG. 7 is one example of a linear grating coupling light into a metal waveguide. In device 1200 of FIG. 12, linear grooves 716 of model 700 are effectively replaced by a two dimensional array of bumps or dimples 1220 that allow vertically and horizontally polarized light to be coupled into separate, orthogonal waveguides 1202 and 1204. Since only light polarized with an electric field perpendicular to linear grooves (e.g., grooves 1206 and 1212) will couple with surface plasmons, light with other polarization does not couple and therefore these linear grooves may operate as a polarization device, as described below.

Figure 13:
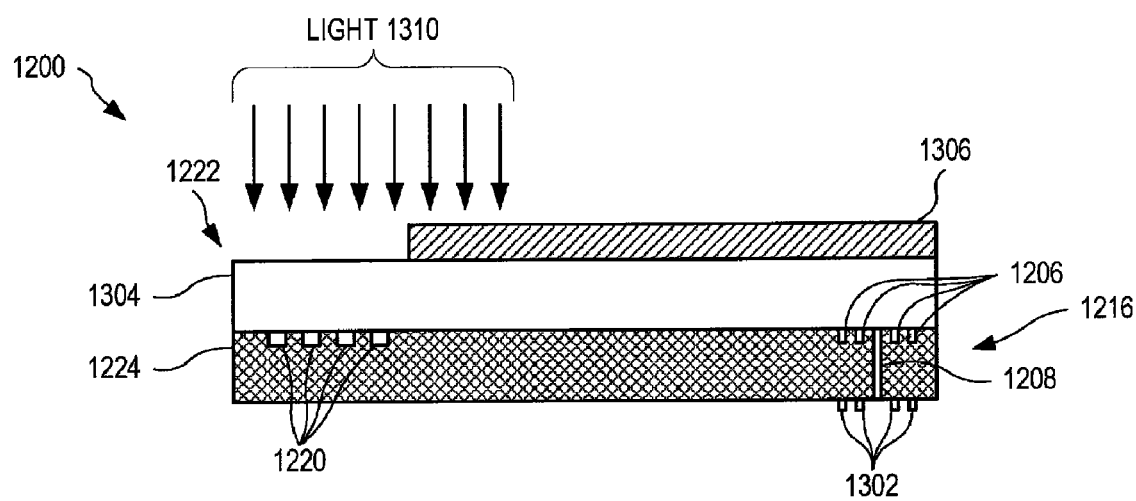
FIG. 13 shows a cross section through the polarization device of FIG. 12.

FIG. 13 shows a cross section (A-A) through polarization device 1200 of FIG. 12. FIGS. 12 and 13 are best viewed together with the following description.

Plasmon waveguide 1202 terminates at an output coupler 1216 formed of grooves 1206 and aperture 1208; plasmon waveguide 1204 terminates at an output coupler 1218 formed of horizontal grooves 1212 and aperture 1214. Output couplers 1216 and 1218 may operate to separate and direct polarized light received by input coupler 1222 to desired, spatially separated, locations.

Waveguides 1202, 1204 and input coupler 1222 may be covered by a dielectric layer 1304. In one example, dielectric layer 1304 is a substrate upon which waveguides 1202, 1204 and input coupler 1222 are formed during fabrication. In order to minimize background signals, a light blocking shield 1306 may be placed above the output couplers, as shown in FIG. 13.

The wavelength of light output from output couplers 1216 and 1218 may be tuned through geometric scaling and positioning of grooves 1206 and 1212, respectively, as described above. Output light may also be focused by grooves 1302 on the output surface of output coupler 1216, as described above, or may be dispersed over a large angle by utilizing a smooth output surface.

Figure 14A:
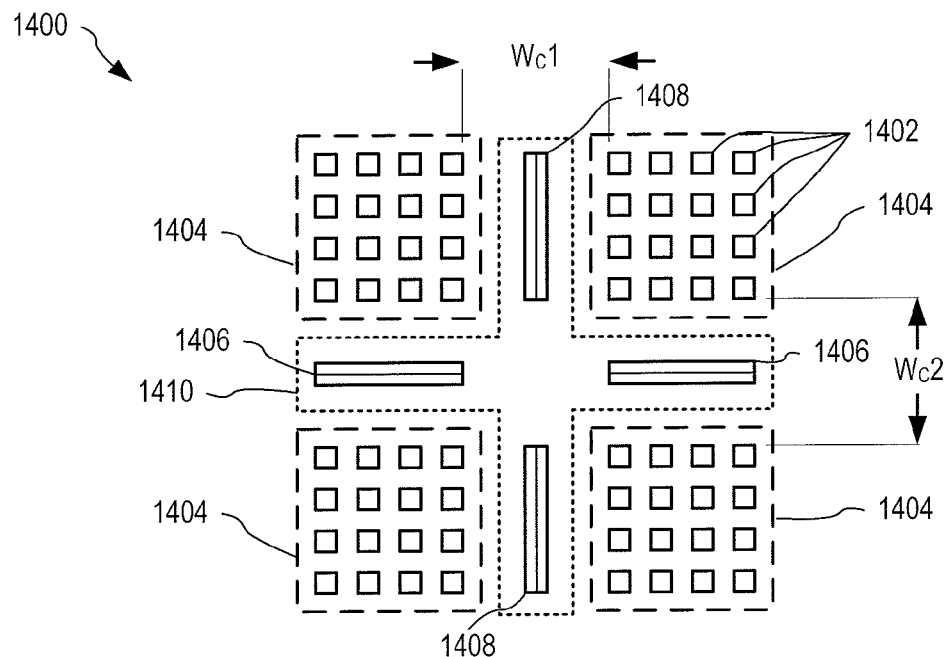
FIG. 14A shows one exemplary layout for a plasmon coupling device that separates vertical and horizontal polarized light.

FIG. 14A shows one exemplary layout for a plasmon coupling device 1400 that separates vertical and horizontal polarized light. Device 1400 has four input areas 1404, each forming sixteen bumps or dimples 1402 for coupling to incident light. Device 1400 also has two vertical apertures 1408 and two horizontal apertures 1406, interspersed between input areas 1404, as shown. An opaque layer may cover area 1410 to prevent incident light from reaching apertures 1406, 1408. Dimples 1402 and vertical apertures 1408 form a cavity width Wc1; dimples 1402 and horizontal apertures 1406 for a cavity width Wc2. Cavity width 'Wc1' determines the resonance wavelength of horizontally polarized light transmitted by apertures 1408 and cavity width 'Wc2' determines the wavelength of vertically polarized light transmitted by apertures 1406. Cavity widths Wc1 and Wc2 may be independently adjusted to select desired wavelengths for horizontally and vertically polarized light output, respectively.

Figure 14B:
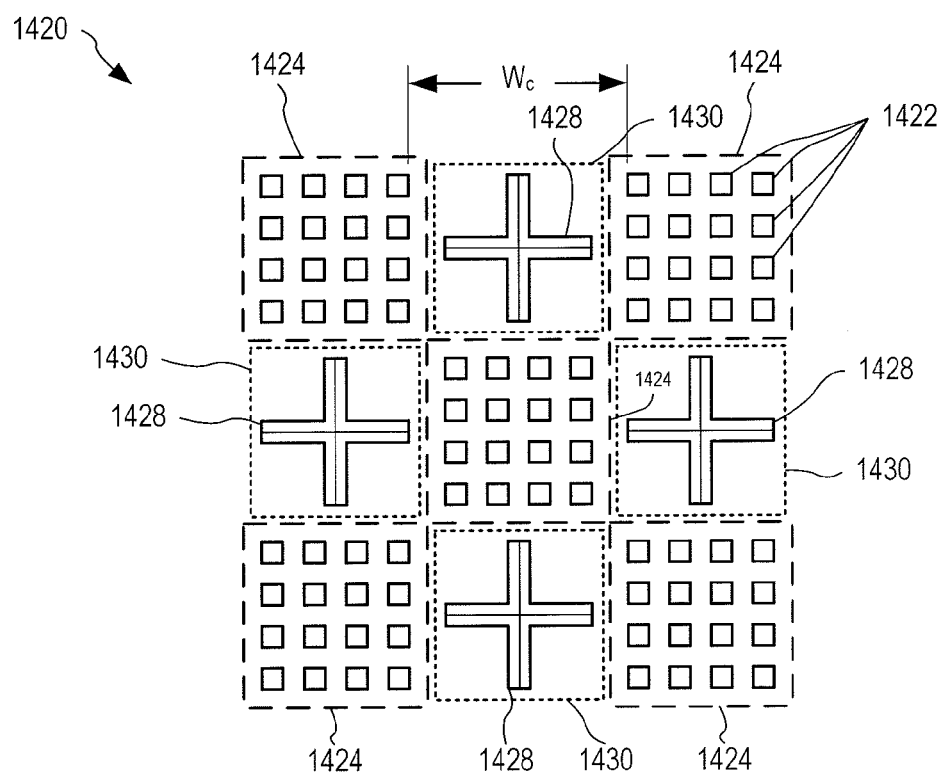
FIG. 14B shows one exemplary plasmon coupling device that operates as an un-polarized bandpass filter.

FIG. 14B shows one exemplary plasmon coupling device 1420 that operates as an un-polarized bandpass filter. Device 1420 has five input areas 1424, each having sixteen bumps or dimples 1422 for coupling to incident light. Device 1420 also has four cross shaped apertures 1428 interspersed between input areas 1424, as shown. An opaque layer may cover areas 1430 to prevent incident light from reaching apertures 1428. Dimples 1422 and apertures 1428 form a cavity width $W_c$ that determines the resonance wavelength of plasmon coupling device 1420; cavity width $W_c$ may thus be adjusted to select a desired wavelength.

Figure 14C:
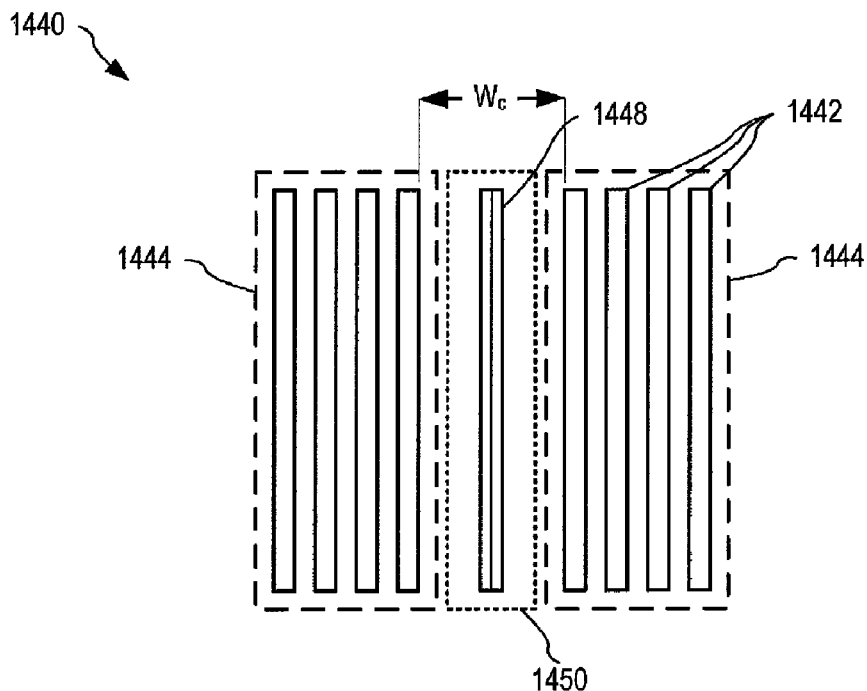
FIG. 14C shows one exemplary plasmon coupling device that operates as a linearly polarized bandpass filter.

FIG. 14C shows one exemplary plasmon coupling device 1440 that operates as a linearly polarized bandpass filter. Device 1440 has two input areas 1444, each forming four grooves 1442 for coupling to incident light. Device 1440 also has an aperture 1448 between input areas 1444, as shown. An opaque layer may cover area 1450 to prevent incident light from reaching aperture 1408. Grooves 1442 and aperture 1448 form a cavity width $W_c$ that determines the resonance wavelength of plasmon coupling device 1440; cavity width $W_c$ may be adjusted to select the wavelength of device 1440.

Devices 1400, 1420 and 1440 may, for example, be utilized as a "plasmon polarimeter on a chip" and monolithically fabricated on a semiconductor photodiode array or on each pixel of a charge coupled device (CCD) array. In one example, a multi-spectral device may be fabricated by varying the plasmon geometry of filters (e.g., devices 1420, 1440) of each column of an array of pixels of a CCD array thereby tuning each column to receive a specific wavelength. An image may then be generated at each wavelength by scanning an image across the detector chip using optics known in the art. This is analogous to early single color infrared imagers that utilized a one-dimensional detector array.

In another example, devices 1420 and/or 1440 (i.e., an un-polarized bandpass filter and/or a linearly polarized bandpass filter) may be fabricated on a transparent substrate. Grooves on the output surface of devices 1400, 1420, 1440 may be included to provide focusing of transmitted light. Note that the transmitted light always emanates normal to the output surface (or some fixed angle) of the device and filter and is independent of the angle of input light. This is in contrast to conventional optics where the angle of light emanating from the optics is determined by the input angle. Although FIGS. 14A, 14B and 14C show the resonator area to be roughly equal to the input coupler area, other configurations may be used.

Multispectral Microbolometer Infrared Sensors

Figure 15:
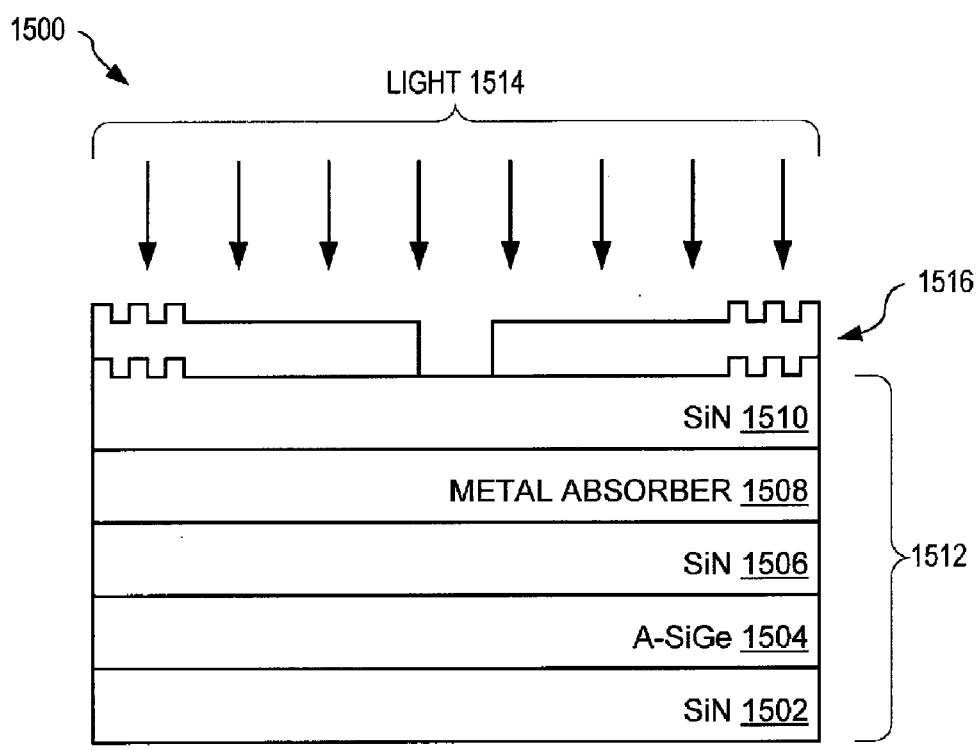
FIG. 15 shows a layer diagram of one exemplary plasmon coupling device incorporated into a microbolometer pixel.

FIG. 15 shows a layer diagram of one exemplary plasmon coupling device 1516 incorporated into a microbolometer pixel 1512. Plasmon coupling device 1516 may, for example, represent one or more of devices 1400, 1420 and 1440 of FIGS. 14A, 14B and 14C, respectively. Microbolometer pixel 1512 and monolithically integrated plasmon coupling device 1516 may, for example, provide multi-spectral sensing or imaging in the 3-5 µm mid-wave infrared (MWIR) or in the 8-14 µm long wave infrared (LWIR) atmospheric transmission windows. Microbolometer pixel 1512 is, for example, a pixel found in a commercially available un-cooled microbolometer LWIR cameras with an air bridge membrane. Pixel 1512 has a broad band metal absorber 1508 and a temperature sensitive resistor 1504 sandwiched between SiN insulating/structural layers 1502, 1506 and 1510. In another example, a-SiGe may be used as a temperature sensing layer. As shown in FIG. 15, plasmon coupling device 1516 may be fabricated on top of a pixel to provide wavelength selectivity.

Figure 16:
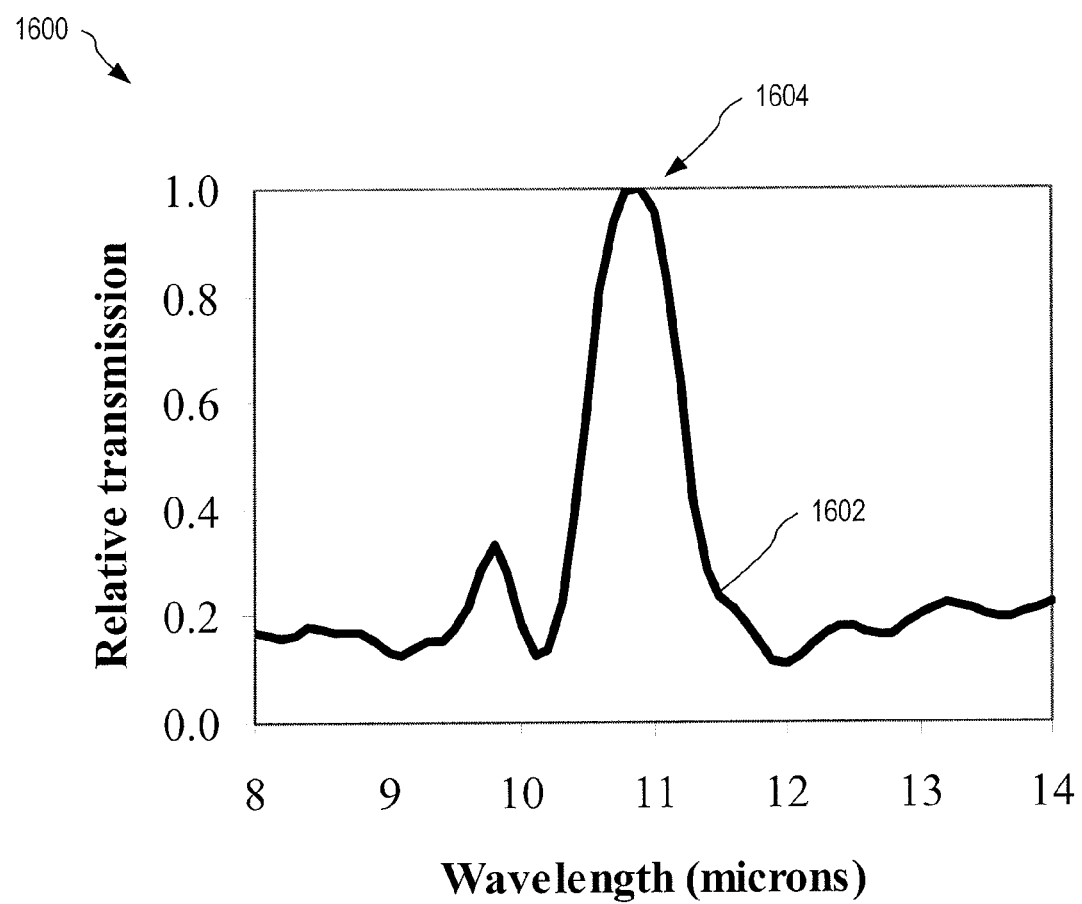
FIG. 16 shows a graph of a modeled transmission through the plasmon coupling device of FIG. 15, illustrating plasmon coupling for a single wavelength band in the LWIR atmospheric window.

FIG. 16 shows a graph 1600 of a modeled transmission through plasmon coupling device 1516, FIG. 15, illustrating a single wavelength band in the LWIR atmospheric window. Plasmon coupling device 1516 may be fabricated with different center wavelengths in a single lithography step by varying its horizontal dimensions, for example. The metal film of plasmon coupling device 1516 may be a few hundred Angstroms thick for operation in the IR, representing a small increase in pixel mass.

The area occupied by metal absorber 1508 may be reduced to collect the transmitted light based upon the size of the aperture of plasmon coupling device 1516, which will compensate at least in part for the increased mass resulting from fabrication of plasmon coupling device 1516. Various layouts are possible using a 2D pixel array. Sub-arrays could be defined with different wavelength response for multi-spectral sensing or reduced resolution imaging. An alternative embodiment utilizes part (e.g., half) of the pixels as broad band absorbers (i.e., with no plasmon coupling device) for conventional imaging, and splits the remaining pixels into multiple wavelength bands for multi-spectral sensing.

Improved Near-Field Probes

Plasmon enhanced near-field optical probes are described in U.S. patent application Ser. No. 11/072,017 titled "Plasmon Enhanced Near-Field Optical Probes," incorporated herein by reference. Plasmon coupling devices disclosed herein may be incorporated within a near-field probe to improve performance. For example, the near-field optical probe may have a conical post surrounded by a ring aperture. A smooth cavity with a surrounding concentric grating completes the structure. A base diameter of the post, aperture diameter, and cavity diameter may be optimized to maximize transmission at the desired wavelength.

The choice of metal used for the patterned metal film depends on the desired operating wavelength and substrate used. The use of silver and gold provides lowest loss, but these metals cannot be used upon a silicon substrate. Aluminum and copper may be used with a silicon substrate, especially at infrared wavelengths. Fabrication of patterned metal films upon a silicon substrate may facilitate monolithic integration of optical functions on silicon CMOS electronics.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A plasmon coupling apparatus for enhanced transmission of electromagnetic energy through a sub wavelength aperture, comprising:
   a substrate; and
   a patterned metal film formed upon the surface of the substrate;
   a plurality of grooves formed in the patterned metal film; and
   a cavity formed centrally in the patterned metal film within the plurality of grooves and having a width defined by a distance between portions of the plurality of grooves extending above the cavity and opposing one another across the cavity; and wherein the aperture is formed in a central region of the cavity;

wherein the width of the cavity is greater than a period of the plurality of grooves.

2. The plasmon coupling apparatus of claim 1, wherein the substrate is transparent at a resonance wavelength of the plasmon coupling apparatus.

3. The plasmon coupling apparatus of claim 1, wherein the substrate is a crystalline silicon wafer.

4. The plasmon coupling apparatus of claim 3, wherein the crystalline silicon comprises electronic circuitry.

5. The plasmon coupling apparatus of claim 1, wherein the patterned metal film supports surface plasmons with low loss at a resonance wavelength of the plasmon coupling apparatus.

6. The plasmon coupling apparatus of claim 5, wherein the patterned metal film is one of silver, gold, aluminum, and copper.

7. The plasmon coupling apparatus of claim 1, wherein the patterned metal film has a thickness of between 300-5000 Å.

8. The plasmon coupling apparatus of claim 1, wherein the patterned metal film has a thickness of between 1500-2500 Å.

9. The plasmon coupling apparatus of claim 1, the plurality of grooves being formed upon an input side of the patterned metal film to enhance transmission of electromagnetic energy incident upon the input side through the aperture.

10. The plasmon coupling apparatus of claim 1, the plurality of grooves being formed upon an output side of the patterned metal film to enhance beaming of electromagnetic energy from the aperture.

11. The plasmon coupling apparatus of claim 1, wherein the plurality of grooves are formed upon an input side and an output side of the patterned metal film to enhance transmission and beaming of electromagnetic energy incident on the input side through the aperture.

12. The plasmon coupling apparatus of claim 11, wherein the size of the output side of the aperture is greater than the size of the input side of the aperture.

13. The plasmon coupling apparatus of claim 1, further comprising a dielectric layer formed upon the surface of the patterned metal film.

14. The plasmon coupling apparatus of claim 1, the grooves comprising substantially vertical walls.

15. The plasmon coupling apparatus of claim 1, the grooves comprising angled walls.

16. The plasmon coupling apparatus of claim 15, the grooves comprising walls angled between 30 and 60 degrees.

17. The plasmon coupling apparatus of claim 1, the periodicity of the grooves being selected to increase power density at the aperture.

18. An apparatus for enhancing transmission of electromagnetic energy through a sub-wavelength aperture, comprising:

a metal film with an input surface and an output surface, the metal film forming (a) the sub-wavelength aperture between the input and output surfaces, (b) a first plurality of grooves on the input surface, and (c) a cavity around the sub-wavelength aperture, a width of the cavity defined by a distance between portions of the first plurality of grooves extending above the cavity and opposing one another across the cavity, wherein the width of the cavity is greater than a period of the first plurality of grooves;

the patterned metal film providing plasmon coupling of electromagnetic energy incident upon the input surface to transmit electromagnetic energy through the sub-wavelength aperture.

19. The apparatus of claim 18, the metal film forming a second plurality of grooves on the output side around the sub-wavelength aperture, to beam electromagnetic energy from the sub-wavelength aperture.

20. The apparatus of claim 18, the aperture being centered to the cavity.

21. A non-polarized bandpass optical filter, comprising:

a plurality of non-polarized optical input areas, each forming a plurality of dimples or bumps; and a plurality of non-polarized optical output areas, each forming at least one aperture that is separated from the nearest of the plurality of dimples or bumps by a distance that is greater than one half period of the plurality of dimples or bumps.

22. The non-polarized bandpass optical filter of claim 21, wherein each aperture is formed as a cross.

23. An enhanced microbolometer pixel, comprising: a non-polarized bandpass optical filter of claim 21; and a microbolometer pixel;

wherein the non-polarized bandpass optical filter is monolithically integrated with the microbolometer pixel, and the non-polarized bandpass optical filter operates to filter incident light such that only non-polarized light of a desired frequency range is incident upon the microbolometer pixel.

24. A polarized bandpass optical filter, comprising:

a first optical input area forming a plurality of first parallel linear grooves; and a second optical input area forming a plurality of second parallel linear grooves, the first and second optical input areas forming a first linear sub-wavelength optical aperture parallel to and disposed between the linear grooves, a nearest linear groove of each of the first and second optical input areas to the first linear sub-wavelength aperture forming a cavity with a width that is greater than a first period of the plurality of first parallel linear grooves and a second period of the plurality of second parallel linear grooves.

25. The polarized bandpass optical filter of claim 24, further comprising:

a third optical input area forming a plurality of third parallel linear grooves; and a fourth optical input area forming a plurality of fourth parallel linear grooves, the third and fourth optical input areas forming a second linear sub-wavelength optical aperture parallel to the linear grooves.

26. An enhanced microbolometer pixel, comprising: P a polarized bandpass optical filter of claim 24; and a microbolometer pixel;

wherein the polarized bandpass optical filter is monolithically integrated with the microbolometer pixel, and the polarized bandpass optical filter operates to filter incident light such that only polarized light of a desired frequency range and polarization is incident upon the microbolometer pixel.

27. Apparatus for spatially separating horizontal and vertical polarized light, comprising:

a plurality of non-polarized optical input areas, each forming a plurality of dimples or bumps;

at least one vertically polarized optical output area forming at least one horizontal linear sub-wavelength aperture, the nearest of the plurality of dimples or bumps on both sides of the horizontal linear sub-wavelength aperture forming a first cavity with a width that is greater than a period of the plurality of dimples or bumps on either side of the horizontal linear sub-wavelength aperture; and at least one horizontally polarized optical output area forming at least one vertical linear sub-wavelength aperture, the nearest of the plurality of dimples or bumps on both sides of the vertical linear sub-wavelength aperture forming a second cavity with a width that is greater than a period of the plurality of dimples or bumps on either side of the vertical linear sub-wavelength aperture.

28. A plasmon enhanced near-field optical probe, comprising:

an optical coupler having an end face;

a metal coating covering, except for an aperture, the end face, the end face and metal coating forming a plurality of concentric grooves around the aperture, wherein a spacing between the aperture and a nearest groove is greater than one half of a period of the plurality of grooves; and an extension for probe-to-sample separation feedback extending from the aperture and away from the optical coupler.

* * * * *